(12) United States Patent
Sato et al.

(10) Patent No.: US 7,330,990 B2
(45) Date of Patent: Feb. 12, 2008

(54) INFORMATION PROCESSING APPARATUS AND METHOD, AND COMPUTER-READABLE MEDIUM

(75) Inventors: Hideki Sato, Kanagawa (JP); Tetsuo Yoshikawa, Shizuoka (JP); Takehiko Seki, Kanagawa (JP); Shigemitsu Kiso, Shizuoka (JP); Hajimu Iwai, Shizuoka (JP); Akira Hayashi, Kyoto (JP)

(73) Assignee: Omron Corporation, Kyoto (JP)

( * ) Notice: Subject to any disclaimer, the term of this patent is extended or adjusted under 35 U.S.C. 154(b) by 386 days.

(21) Appl. No.: 10/912,233

(22) Filed: Aug. 6, 2004

(65) Prior Publication Data

US 2005/0034003 A1    Feb. 10, 2005

(30) Foreign Application Priority Data

Aug. 8, 2003    (JP)    ............... P. 2003-289973
May 31, 2004    (JP)    ............... P. 2004-161164

(51) Int. Cl.
*G06F 11/30* (2006.01)

(52) U.S. Cl. ................. 713/340; 713/300

(58) Field of Classification Search ........ 713/300, 713/340
See application file for complete search history.

(56) References Cited

U.S. PATENT DOCUMENTS 6,041,414 A * 3/2000 Kikuchi ............ 713/300
6,396,169 B1 * 5/2002 Voegeli et al. ........ 307/52
6,691,248 B1 * 2/2004 Nishijima et al. ....... 714/14
6,735,704 B1 * 5/2004 Butka et al. ........... 713/300
6,854,065 B2 * 2/2005 Smith et al. ........... 713/300
6,865,685 B2 * 3/2005 Hammond et al. ..... 713/340
7,036,035 B2 * 4/2006 Allison et al. ......... 713/340
7,045,914 B2 * 5/2006 Liu et al. .............. 307/64
7,152,175 B2 * 12/2006 Madany et al. ........ 713/340
2002/0069371 A1 * 6/2002 Teeling ................. 713/300
2003/0033550 A1 * 2/2003 Kuiawa et al. ......... 713/340
2003/0132949 A1 * 7/2003 Fallon et al. .......... 345/700
2004/0010649 A1 * 1/2004 Weaver et al. ......... 710/302

FOREIGN PATENT DOCUMENTS

CN    1307260 A    8/2001
JP    2001-178018   6/2001
JP    2002-73221    3/2002

OTHER PUBLICATIONS

"Uninterruptible Power Supply Unit (UPS) Technical Manual Shutdown Software/Battey/FAQ/Successor Machine Version." pp. 4-9.

* cited by examiner

*Primary Examiner*—Thomas Lee
*Assistant Examiner*—Vincent T Tran
(74) *Attorney, Agent, or Firm*—Dickstein Shaprio LLP

(57) ABSTRACT

Based on information that is transmitted to a UPS communication part by UPSs connected to an information processing apparatus, a UPS monitoring part monitors the states of the UPSs. A UPS control part employs the monitoring results to generate control information for controlling the state of at least one of the UPSs, and permits the UPS communication part to transmit the control information to the UPS that is to be controlled. The present invention can be applied for a computer having a redundant power supply function.

2 Claims, 27 Drawing Sheets

FIG. 8

| UPS "INPUT POWER SOURCE ABNORMALITY" (OCCURRED: ○ / DID NOT OCCUR (NORMAL STATE): ×) | | | SHUTDOWN (EXECUTE: ○ / INHIBIT: ×) | STOP INSTRUCTION TO UPS OUTPUT (UPS STOPPED STATE): ○ / INHIBIT OUTPUT (UPS OPERATING STATE MAINTAINED): × | | |
|---|---|---|---|---|---|---|
| UPS 2-1 | UPS 2-2 | UPS 2-3 | | UPS 2-1 | UPS 2-2 | UPS 2-3 |
| × | ○ | ○ | × | × | ○ | ○ |
| ○ | × | ○ | × | ○ | × | ○ |
| ○ | ○ | × | × | ○ | ○ | × |
| ○ | ○ | ○ | ○ | ○ | ○ | ○ |

FIG. 10

| UPS "INPUT POWER SOURCE ABNORMALITY" (OCCURRED: ○ / DID NOT OCCUR (NORMAL STATE): ×) | | | SHUTDOWN (EXECUTE: ○ / INHIBIT: ×) | STOP INSTRUCTION TO UPS OUTPUT (UPS STOPPED STATE): ○ / INHIBIT OUTPUT (UPS OPERATING STATE MAINTAINED): × | | |
|---|---|---|---|---|---|---|
| UPS 2-1 | UPS 2-2 | UPS 2-3 | | UPS 2-1 | UPS 2-2 | UPS 2-3 |
| × | × | × | × | × | × | × |
| × | × | ○ | × | × | × | ○ |
| × | ○ | × | × | × | ○ | × |
| ○ | × | × | × | ○ | × | × |
| × | ○ | ○ | ○ | ○ | ○ | ○ |
| ○ | × | ○ | ○ | ○ | ○ | ○ |
| ○ | ○ | × | ○ | ○ | ○ | ○ |
| ○ | ○ | ○ | ○ | ○ | ○ | ○ |

FIG. 12

| UPS "INPUT POWER SOURCE ABNORMALITY" (OCCURRED: ○ / DID NOT OCCUR (NORMAL STATE): ×) | | | | SHUTDOWN (EXECUTE: ○ / INHIBIT: ×) | STOP INSTRUCTION TO UPS OUTPUT (UPS STOPPED STATE): ○ / INHIBIT OUTPUT (UPS OPERATING STATE MAINTAINED): × | | | |
|---|---|---|---|---|---|---|---|---|
| UPS 2-1 | UPS 2-2 | UPS 2-3 | UPS 2-4 | | UPS 2-1 | UPS 2-2 | UPS 2-3 | UPS 2-4 |
| × | × | × | × | × | × | × | × | × |
| × | × | × | ○ | × | × | × | × | ○ |
| × | ○ | × | × | × | × | ○ | × | × |
| × | × | ○ | × | × | × | × | ○ | × |
| ○ | × | × | × | × | ○ | × | × | × |
| × | × | ○ | ○ | × | × | × | ○ | ○ |
| × | ○ | ○ | × | × | × | ○ | ○ | × |
| × | ○ | × | ○ | × | × | ○ | × | ○ |
| ○ | × | × | ○ | × | ○ | × | × | ○ |
| ○ | ○ | × | × | × | ○ | ○ | × | × |
| ○ | × | ○ | × | × | ○ | × | ○ | × |
| × | ○ | ○ | ○ | ○ | ○ | ○ | ○ | ○ |
| ○ | × | ○ | ○ | ○ | ○ | ○ | ○ | ○ |
| ○ | ○ | ○ | × | ○ | ○ | ○ | ○ | ○ |
| ○ | ○ | × | ○ | ○ | ○ | ○ | ○ | ○ |
| ○ | ○ | ○ | ○ | ○ | ○ | ○ | ○ | ○ |

FIG. 14 http://192.168.2.106 — POWERACTPRO MONITOR STORM (FULL ACCESS) —

SYSTEM    LOG    ACTIVATE UPS    MANUAL OPERATION    HELP

BUZZER
AUTOMATIC BATTERY TEST
OUTPUT VOLTAGE/INPUT SENSITIVITY
BATTERY USAGE START DATE (EXCHANGE DATE)    PREVIOUS BATTERY USAGE START DATE (EXCHANGE DATE): JANUARY 5, 2004

DATE AND TIME: 09:23:45 JANUARY 15, 2004

UPS FORM: EN240XR
UPS STATE: COMMERCIAL AC POWER OPERATION
OUTPUT OUTLET A (CONTROLLED) STATE: CURRENTLY OUTPUT
OUTPUT OUTLET B (CONTROLLED) STATE: CURRENTLY OUTPUT
OUTPUT OUTLET C (CONTROLLED) STATE: CURRENTLY OUTPUT
BATTERY STATE: NORMAL
EXTENDED BATTERY: 0

BUZZER: ON
AUTOMATIC BATTERY TEST: YES
OUTPUT VOLTAGE/INPUT SENSITIVITY: 100V/STANDARD SENSITIVITY
AUTOMATIC UPS REACTIVATION: YES

| | 10 | 60 | 80 | 100 | 120 | 140 | |
|---|---|---|---|---|---|---|---|
| INPUT VOLTAGE: | | | | | | | 102.8 V |
| OUTPUT VOLTAGE: | 10 | 60 | 80 | 100 | 120 | 140 | 102.6 V |
| INPUT FREQUENCY: | 40 | 45 | 50 | 55 | 60 | 65 | 50.1 Hz |
| CONNECTION CAPACITY: | 0 | 25 | 50 | 75 | 100 | 125 | 0 % |
| BATTERY CAPACITY: | 0 | 25 | 50 | 75 | 100 | 125 | 100 % |

COMMUNICATION PORT: USB1 ▼    SETUP

TEST RESULTS:

NEXT SHUTDOWN (DATE AND TIME):    NEXT UPS REACTIVATION (DATE AND TIME):    ESTIMATED BACKUP TIME: 240 MINUTES

09:15:13, JANUARY 15, 2004 "BUZZER TEST" WAS CONDUCTED. [UPS (FORM: EN240XR/COMMUNICATION PORT USB1)]
09:14:46, JANUARY 15, 2004 COMMUNICATION WAS ESTABLISHED. [UPS (FORM: EN240XR/COMMUNICATION PORT USB1)] COMMUNICATION WITH UPS WAS STARTED.

FIG. 15 http://192.168.2.106 — BATTERY USAGE START DATE (EXCHANGE DATE) [BN240XR/USB1]

PREVIOUS BATTERY USAGE START DATE (EXCHANGE DATE):
JANUARY 5, 2004
BATTERY USAGE START DATE (EXCHANGE DATE)

2004-01-15    DATE

SETUP    CANCEL

SHUTDOWN PARAMETER UPS (MASTER)

| SHUTDOWN PARAMETER | UPS ACTIVATION/RE-ACTIVATION | LOG OPTION | COMMUNICATION SETUP |

| AGENT SELECTION | REDUNDANT POWER SUPPLY SYSTEM | OTHER DEVICES | OUTPUT OUTLET INFORMATION |

UPS OUTPUT OUTLET SELECTION: [OUTPUT OUTLET A (NO CONTROL) ▶]

STANDBY TIME: [60 ▶] SECONDS

SHUTDOWN START DELAY: [0 ▶] SECONDS

TIME NECESSARY FOR SHUTDOWN: [180 ▶] SECONDS

EXTERNAL COMMAND LINE: [            ]

EXTERNAL COMMAND EXECUTION TIME: [0 ▶] SECONDS

OS END MODE: [END AS "STOPPED STATE" ▶]

[DEFAULT]

[SETUP] [CANCEL]

FIG. 18

☐ VALIDATE A "1+1 OR 1+K" REDUNDANT POWER SUPPLY SYSTEM

■ VALIDATE AN "N+1 OR N+K" REDUNDANT POWER SUPPLY SYSTEM.
ENTER THE NUMBER OF POWER UNITS MOUNTED ON A INFORMATION PROCESSING APPARATUS   [ 3 ] UNITS

ENTER THE NUMBER OF POWER UNITS REQUIRED FOR THE NORMAL OPERATION OF A INFORMATION PROCESSING APPARATUS.
HOW MANY POWER UNITS IS A UPS SUPPLYING ELECTRIC POWER TO?   [ 2 ] UNITS

| COMMUNICATION PORT | UPS FORM | POWER UNIT COUNT |
|---|---|---|
| COM1 | BN150XR | 1 |
| COM2 | BN150XR | 1 |
| USB1 | BN150XR | 1 |

[NOTE]
FOR EACH INPUT COLUMN, ENTER THE NUMBER OF POWER UNITS FOR A COMPUTER (POWERACTPRO MASTER AGENT INSTALLED).

FIG. 21

| http://192.168.2.106 | — UPS ACTIVATION/RE-ACTIVATION — |

| SHUTDOWN PARAMETER | UPS ACTIVATION/RE-ACTIVATION | LOG OPTION | COMMUNICATION SETUP |

---- UPS REACTIVATION SETUP ----

AUTOMATIC UPS REACTIVATION  [YES ▶]

---- OUTPUT START DELAY TIME AT UPS START ----

OUTPUT OUTLET A (NO CONTROL):  [0 ▶]  SECONDS
OUTPUT OUTLET B (CONTROLLED):  [0 ▶]  SECONDS
OUTPUT OUTLET C (CONTROLLED):  [0 ▶]  SECONDS

[SETUP]  [CANCEL]     [DEFAULT]

FIG. 23 http://192.168.2.106 — UPS ACTIVATION/RE-ACTIVATION —

SHUTDOWN PARAMETER | UPS ACTIVATION/RE-ACTIVATION | LOG OPTION | COMMUNICATION SETUP

COMMUNICATION PORT

| NO. | COMMUNICATION PORT | UPS FORM | CORRECT | DELETE |
|-----|--------------------|----------|---------|--------|
| 1   | USB1               | EN240XR  | 🔍      | 🔍     |

ADD PORT    AUTOMATIC SELECTION

NETWORK PORT ADDRESS

HTTP PORT [ 80 ]

☐ INHIBIT REMOTE ACCESS
- USE IP ADDRESS 127.0.0.1 TO ACCESS A MASTER AGENT.
- APACHE HTTPSERVER WILL BE RE-ACTIVATED TO VALIDATE A SETUP.

SMTP EMAIL

TRANSMISSION EMAIL (SMTP) SERVER (E.G.: smtp.omran.co.jp) [          ]

EMAIL ADDRESS (E.G.: omran01@omran.co.jp) [          ]

DOMAIN NAME (E.G.: omran.co.jp) [          ]

DEFAULT    SETUP    CANCEL

FIG. 24 http://192.168.2.106 — ADD/DELETE SCHEDULED OPERATION —

SCHEDULED OPERATION    ADD/DELETE SCHEDULED
                       OPERATION

SCHEDULED OPERATION ENTRY: [STOP DATE/START DATE]  [DESIGNATED DATE]

─ SCHEDULED OPERATION CONTENTS ─
STOP DATE/EXECUTION DATE

[2004-01-14] DATE   TIME [17 ▶] : [00 ▶]

☑ VALIDATE SCHEDULED OPERATION (START DATE)
START DATE

[2004-01-15] DATE   TIME [08 ▶] : [30 ▶]

[NOTE]
WHEN THE SAME DATE IS DESIGNATED FOR STOPPING/STARTING A SCHEDULED OPERATION, OBTAIN AN INTERVAL
OF 31 MINUTES BETWEEN THE TIME FOR A STOP DATE AND THE TIME FOR A START DATE

[SETUP]  [CANCEL]

FIG. 25

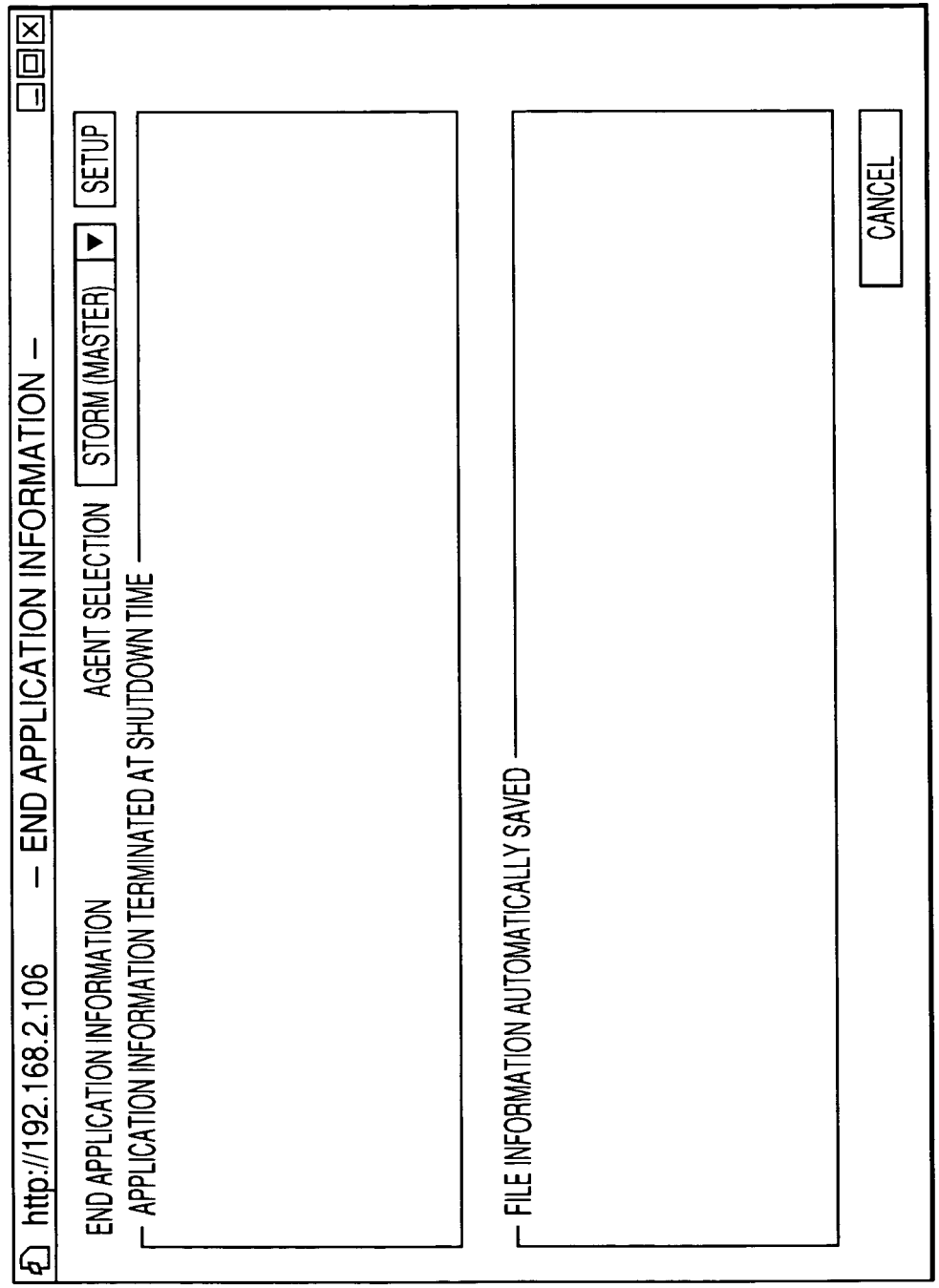

FIG. 27

```
http://192.168.2.106    – AUTOMATIC AGENT SEARCH –        □□☒

SYSTEM    LOG    ACTIVATE UPS    MANUAL OPERATION    HELP

[icons]  [SETUP] [?]

COMMUNICATION PORT
          GROUP      UPS                   BATTERY  (COMMUNICATION STATE)
MASTER/SLAVE MEMBER  FORM    UPS STATE     STATE

GROUP MEMBER
  STORM           EN240XR  CURRENTLY COMMERCIAL  NORMAL      USB1
                           POWER OPERATING              (CURRENTLY COMMUNICATING)
    HANDMAID-NG1805

CCLL            EX50XF   CURRENTLY COMMERCIAL  NORMAL      COM1
                           POWER OPERATING              (CURRENTLY COMMUNICATING)
    NAB
```

INFORMATION PROCESSING APPARATUS AND METHOD, AND COMPUTER-READABLE MEDIUM

BACKGROUND OF THE INVENTION

1. Field of the Invention

The present invention relates to an information processing apparatus and method, and a computer-readable medium storing instructions for operating the information processing apparatus. Particularly, the present invention relates to a information processing apparatus and method, which can control power supplies without another controller when a plurality of power supplies are connected the information processing apparatus as input power sources of the information processing apparatus, and a computer-readable medium storing instructions for operating the information processing apparatus.

2. Description of the Related Art

In recent years, information processing apparatuses have become popular, and its importance has been increased year by year. However, there are many cases that electric power which is consumed by an information processing apparatus is directly supplied from a commercial alternating current power source, and, because of this, there are many cases that, when there occurs something wrong with the commercial alternating current power source (for example, when there occurs instantaneous lowering (instantaneous shutoff) of a voltage, sudden blackout, etc.), there occur such defects that information which is processed by an information processing apparatus at that time point is destroyed and lost, and in addition, an information processing apparatus itself (e.g., built-in hard disk etc.) is damaged.

In this connection, in order to avoid occurrence of the suchlike defects, in recent years, there are many cases that a uninterruptible power supply (UPS) is connected to an information processing apparatus (For example, see JP-A-2002-73221). This UPS, in case that a commercial alternating current power source is normal, supplies electric power from that commercial alternating current power source to an information processing apparatus, and, in case that a commercial alternating current power source is abnormal, switches its output, and can supply electric power from a built-in battery to an information processing apparatus.

By this, an information processing apparatus to which UPS was connected can use electric power which is supplied from a battery in UPS, even if there occurs something wrong with a commercial alternating current power source, and therefore, it becomes possible to continue processing as it is.

In this regard, however, a battery is a standby power supply to the bitter end, and its electric power supply capability has limitation. That is, such time that a battery is capable of outputting a voltage of a predetermined level or more (hereinafter, the suchlike time is referred to as power feedable time) has limitation. On this account, within this power feedable time, there is such a necessity that an information processing apparatus stops processing which has been carried out up to now, and carries out processing for transferring a state of itself from an operating state to such a state that it is enabled even if an input power source is cut off (hereinafter, the suchlike group of processing is referred to as shutdown processing).

Concretely speaking, for example, there are many cases that a computer etc. out of an information processing apparatus is executing application software which is operated on a predetermined OS (Operating System). In this case, the computer etc. launches its application, as the shutdown processing, and also, stores necessary data arbitrarily, and then, carries out processing for deactivating its OS.

On one hand, when discharge of a battery is carried out more than necessary, there occurs such defects that life of the battery is shortened, and it becomes unavailable for use (impossible to discharge again at a voltage with a level which satisfies a specification) even if it is charged again. On this account, there is such a necessity that, after an information processing apparatus completed the shutdown processing, as soon as possible, UPS which was connected to the information processing apparatus carries out processing for stopping discharge of a built-in battery, i.e., processing for transferring a state of the UPS from an operating state for outputting electric power to a stop state for prohibiting its output (hereinafter, the suchlike processing is referred to as UPS stop processing).

In this connection, OMRON Corporation is conducting sales of application software as shown in "Uninterruptible Power Supply Unit (UPS) Technical Manual Shutdown Software/Battery/FAQ/Successor Machine Version" written by OMRON Corporation, published by OMRON Corporation, published on Apr. 1, 2003, p.4-9 (hereinafter, the suchlike application software is referred to as shutdown software). An information processing apparatus in which this shutdown software was installed monitors a state of UPS which was connected to it, and carries out the shutdown processing, in case that there occurred something wrong with an input power source of UPS, and can have the UPS carried out the UPS stop processing.

In addition, here, in case of having focused on a predetermined apparatus, an object for supplying (inputting) electric power (regardless of whether that apparatus consumes or not) to that apparatus is referred to as an input power source. For example, as a matter stands now, UPS is focused on, and an object for supplying (inputting) electric power to that UPS is a commercial alternating current power source, and therefore, this commercial alternating current power source becomes an input power source.

As another countermeasure for an abnormality occurring at the power supply portion of an information processing apparatus, i.e., as a countermeasure that differs from the above described countermeasure, such as the connection of a UPS to an information processing apparatus, a function (hereinafter referred to as a redundant power supply function) has recently been added that provides redundancy for the power supply system of an information processing apparatus.

That is, a plurality of power units are employed for an information processing apparatus that has a redundant power supply function, and when an abnormality occurs at one of these power units, the electric power required to operate the information processing apparatus is supplied by the remaining power unit(s).

Therefore, in order to further improve the reliability of the information processing apparatus, it has been proposed that a plurality of UPSs be employed as input power sources for the information processing apparatus that has such a redundant power supply function, i.e., a plurality of UPSs are respectively connected to a plurality of power units.

However, the related-art shutdown software, as described in "Uninterruptible Electric power supply part (UPS) Technical Manual Shutdown Software/FAQ/Successor Machine Version" above, does not cope with the usage of a plurality of UPSs as input power sources for the information processing apparatus with the redundant power supply function. Therefore, when a plurality of UPSs are employed as input power sources for an information processing apparatus with the redundant power supply function, another controller, as disclosed in JP-A-2002-73221, that differs from the information processing apparatus is required to perform the shutdown processing and the UPS stop processing.

SUMMARY OF THE INVENTION

It is an object of the present invention to provide an information processing apparatus and method, which can control power supplies without another controller when a plurality of power supplies are connected the information processing apparatus as input power sources of the information processing apparatus, and a computer-readable medium storing instructions for operating the information processing apparatus According to one aspect of the present invention, an information processing apparatus comprises:

an electric power supply part that is connected to a plurality of power supplies to provide, for the information processing apparatus, electric power output by the power supplies;

a communication part for exchanging information with the power supplies connected to the electric power supply part;

a monitoring part for monitoring states of the power supplies connected to the electric power supply part, based on the information that is transmitted to the communication part by the power supplies; and a control part for generating control information for controlling the state of at least one of the power supplies connected to the electric power supply part based on monitoring results obtained by the monitoring part, and for permitting the communication part to transmit the control information to the power supply that is to be controlled According to the information processing apparatus of the invention, a electric power supply part connected to multiple power supplies transmits, to the information processing apparatus, electric power output by these power supplies, and the communication part exchanges information with the individual power supplies connected to the electric power supply part. Further, based on the information that is transmitted to the communication part by the power supplies connected to the electric power supply part, the monitoring part monitors the states of the individual power supplies and the control part generates control information for controlling the state of at least one of the power supplies connected to the electric power supply part based on the monitoring results. The control information is transmitted by the communication part to the power supply that is to be controlled.

With this configuration, when a plurality of power supplies are connected as input power sources for the information processing apparatus, the information processing apparatus can control these power supplies, without another controller.

The power supplies connected to the electric power supply part can, for example, be uninterruptible power supplies (UPSs) The electric power supply part can, for example, be a power supply system that includes a plurality of power units.

The communication part can, for example, be a communication board or a communication card having as a function the performance of serial communication with the individual power supplies.

The monitoring part can, for example, be a CPU (Central Processing Unit) that executes application software having a function that monitors the states of individual power supplies based on information that is transmitted to the communication part by the power supplies connected to the electric power supply part.

The control part can, for example, be a CPU that executes application software having a function that generates control information for controlling the state of at least one of the power supplies connected to the electric power supply part based on the monitoring results obtained by the monitoring part, and that permits the communication part to transmit the control information to the power supply that is to be controlled.

The information processing apparatus further comprises:

a state shift part for, when an abnormality has occurred at an input power source for at least one of the power supplies connected to the electric power supply part and when, as a result, it is determined that the number of power supplies for which input power sources are in the normal state is smaller than a predetermined number, performing a processing wherein the information processing apparatus stops a currently performed processing, and in accordance with predetermined procedures, the state of the information processing apparatus is shifted from an operating state to a state that is not affected by the cutoff of power supplied by the electric power supply part, and for, when the determination result obtained by the monitoring part indicates the other cases, performing a processing wherein the operating state of the information processing apparatus is maintained.

With this configuration, the following problems can be resolved.

Assume that a UPS is employed as a power supply to be connected to the information processing apparatus, and that n (n is an integer of one or greater) UPSs are required to operate the information processing apparatus. Further, assume that n+k (k is an integer of one or greater) UPSs are currently connected to the electric power supply part, and that an abnormality has occurred at an input power source for at least one of the n+k UPSs, and that the number of UPSs for which input power sources are in the normal state is smaller than n.

In this case, when the information processing apparatus still continues the processing, the discharge from the battery of the UPS where the abnormality has occurred (i.e., the UPS that supplies electric power through the battery) is continued, until the UPS finally disables the supply of electric power to the information processing apparatus (disables the output of electric power at a level that satisfies the specifications). That is, substantially, the number of UPSs that can supply electric power to the information processing apparatus is smaller than n. As a result, the information processing apparatus can not receive the electric power required for a normal operation, so that the information currently being processed is lost, and the information processing apparatus (e.g., the incorporated hard disk) is damaged.

To resolve this problem, a state shift part is further provided to reliably perform the shutdown processing.

Even when an abnormality has occurred at an input electric source for one of the UPSs connected to the electric power supply part, so long as n or more UPSs continue to be operated with their input electric sources in the normal state, the state shift part maintains the operating state of the information processing apparatus, i.e., inhibits the execution of the shutdown processing. Therefore, the information processing apparatus can continue processing currently being performed, i.e., an unnecessary shutdown processing can be avoided.

The information processing apparatus further comprises:

a detector for detecting the number of power supplies wherein abnormalities at the input power sources have occurred, wherein, when it is determined that a difference between the count of the power supplies connected to the electric power supply part and the count of the power supplies detected by the detector is smaller than a predetermined number, the state shift part performs a processing which the information processing apparatus stops a process currently being performed, and in accordance with predetermined procedures, the operating state of the information processing apparatus is shifted to a state that is not affected by the cutoff of power from the electric power supply part, and wherein, when the monitoring result obtained by the monitoring part is for the other cases, the state shift part performs a processing which the operating state of the information processing apparatus is maintained.

As is described above, a detector is further provided that detects the number of power supplies, i.e., UPSs, connected to the information processing apparatus at which abnormalities at their input electric sources have occurred. When it is determined that a difference between the number of UPSs connected to the information processing apparatus and the number of UPSs obtained by the detector is smaller than a predetermined number, the state shift part correctly performs the shutdown processing. With this arrangement, it is possible to resolve the problems described above wherein the power required for a normal operation is not supplied and information that is currently being processed is destroyed or lost, and wherein the information processing apparatus (e.g., the incorporated hard disk) is damaged.

Further, when an abnormality has occurred at the input power source for one of the UPSs connected to the information processing apparatus, and when it is determined that a difference between the number of UPSs connected to the information processing apparatus and the number of UPSs detected by the detector is not smaller than the predetermined number, the state shift part maintains the operating state of the information processing apparatus. Therefore, the information processing apparatus can continue the processing that is currently being performed (the performance of an unnecessary shutdown processing can be avoided).

Furthermore, when the monitoring part determines that an abnormality has occurred at the input power source of at least one of the power supplies connected to the electric power supply part, the control part generates, as control information, a stop instruction for shifting the power supply from an operating state, wherein the output of electric power is performed, to a stopped state wherein the output of electric power is stopped. And before the state shift part begins a process, the control part permits the communication part to transmit a stop instruction to a power supply for which it has been determined that an abnormality has occurred at the input power source.

With this arrangement, when UPSs are employed as power supplies connected to the information processing apparatus, and when an abnormality has occurred at the input power source of a specific UPS, the unnecessary discharge of an incorporated battery can be prevented, and as a result, the deterioration (a reduction in the service life) of the battery can be avoided.

According to another aspect of the invention, an information processing method for an information processing apparatus that includes a electric power supply part which is connected to a plurality of power supplies and provides, for the information processing apparatus, electric power output by the power supplies, and a communication part for exchanging information with the power supplies connected to the electric power supply part, the method comprises:

monitoring states of the power supplies connected to the electric power supply part, based on the information that is transmitted to the communication part by the power supplies; and generating control information for controlling the states of the individual power supplies connected to the electric power supply part based on monitoring results obtained by the monitoring step, and permitting the communication part to transmit the control information to a power supply that is to be controlled.

According to an additional aspect of the invention, a computer-readable medium storing instructions for operating an information processing apparatus which includes an electric power supply part connected to a plurality of power supplies for providing, for the information processing apparatus, power output by the power supplies, and a communication part for exchanging information with the power supplies connected to the electric power supply part, the instructions comprising:

monitoring states of the power supplies connected to the electric power supply part, based on the information that is transmitted to the communication part by the power supplies; and generating control information for controlling the states of the individual power supplies connected to the electric power supply part based on monitoring results obtained at the monitoring step, and permitting the communication part to transmit the control information to a power supply that is to be controlled.

The information processing method and the computer-readable medium of the invention are provided for a information processing apparatus that comprises: an electric power supply part connected to a plurality of power supplies, for providing, for the information processing apparatus, electric power output by the power supplies; and a communication part for exchanging information with the power supplies connected to the electric power supply part. That is, when the information processing method or the computer-readable medium for the invention is employed for the information processing apparatus, based on the information that is transmitted to the communication part by the individual power supplies connected to the electric power supply part, monitoring of the states of the power supplies is performed. And based on the results obtained by the monitoring, control information is generated for controlling the state of at least one of the power supplies connected to the electric power supply part, and the communication part transmits the control information to the power supply that is to be controlled.

As a result, when a plurality of power supplies (e.g., UPSs) are connected as input power sources for a information processing apparatus for which the information processing method or the computer-readable medium of the invention is employed, this information processing apparatus, as well as the information processing apparatus of the invention, can control the power supplies, without another control part being present.

A information processing apparatus for which the information processing method or the computer-readable medium of the invention is applied can, for example, be a computer that functions as a server. Particularly, the electric power supply part can, for example, be a power supply system having a plurality of power units, and the communication part can, for example, be a communication board or a communication card having a function for the performance of serial communication with the individual power supplies.

The monitoring step can, for example, be a step of a CPU monitoring the states of the power supplies connected to the electric power supply part, based on information transmitted to the communication part by the power supplies.

The control step can, for example, be a step of a CPU generating control information for controlling the state of at least one of the power supplies connected to the electric power supply part based on the monitoring results obtained at the monitoring step, and of the CPU permitting the communication part to transmit the control information to a power supply that is to be controlled.

As is described above, according to the present invention, a plurality of power supplies (e.g., UPSs) can be connected as input power sources for an information processing apparatus, i.e., a redundant power supply function can be provided for an information processing apparatus. Therefore, without another controller, the information processing apparatus can separately control multiple power supplies connected to the apparatus.

BRIEF DESCRIPTION OF THE DRAWINGS

FIG. 8 is a diagram showing the relationship between the states of the input power sources for the individual UPSs and the presence/absence of the shutdown processing and the UPS stop processing when the information processing apparatus in FIG. 6 performs the shutdown processing and UPS stop processing shown in FIG. 7;

FIG. 10 is a diagram showing the relationship between the states of the input power sources for the individual UPSs and the presence/absence of the shutdown processing and the UPS stop processing when the information processing apparatus in FIG. 2 performs the shutdown processing and UPS stop processing shown in FIG. 9;

FIG. 12 is a diagram showing the relationship between the states of the input power sources for the individual UPSs and the presence/absence of the shutdown processing and the UPS stop processing when the information processing apparatus in FIG. 6 performs the shutdown processing and UPS stop processing shown in FIG. 11;

FIG. 14 is a diagram showing an example setup screen for setting parameters for individual entries;

FIG. 15 is a diagram showing an example setup screen for setting a parameter for individual entry "battery usage start date";

FIG. 16 is a diagram showing an example setup screen for setting parameters for individual entries;

FIG. 17 is a diagram showing an example setup screen for setting a parameter for common sub-entry "shutdown parameter" in common entry "environment setup";

FIG. 18 is a diagram showing an example setup screen for setting a parameter for common sub-entry "shutdown parameter" in common entry "environment setup";

FIG. 21 is a diagram showing an example setup screen for setting a parameter for common sub-entry "UPS ACTIVATION/RE-ACTIVATION" in common entry "environment-setup";

FIG. 23 is a diagram showing an example setup screen for setting a parameter for common sub-entry "communication setup" in common entry "environment setup";

FIG. 24 is a diagram showing an example setup screen for setting a parameter for common sub-entry "schedule" in common entry "schedule";

FIG. 25 is a diagram showing an example setup screen for setting a parameter for common sub-entry "schedule" in common entry "schedule";

FIG. 26 is a diagram showing an example setup screen for setting a parameter for common entry "end application information"; and FIG. 27 is a diagram showing an example setup screen for setting a parameter for common entry "agent search".

DETAILED DESCRIPTION OF THE INVENTION

An information processing system and an information processing apparatus for which the present invention is applied will now be described while referring to drawings.

In the following explanation, a UPS (Uninterruptible Power Supply) is employed as a power supply; however, another type of power supply may also be employed.

Figure 1:
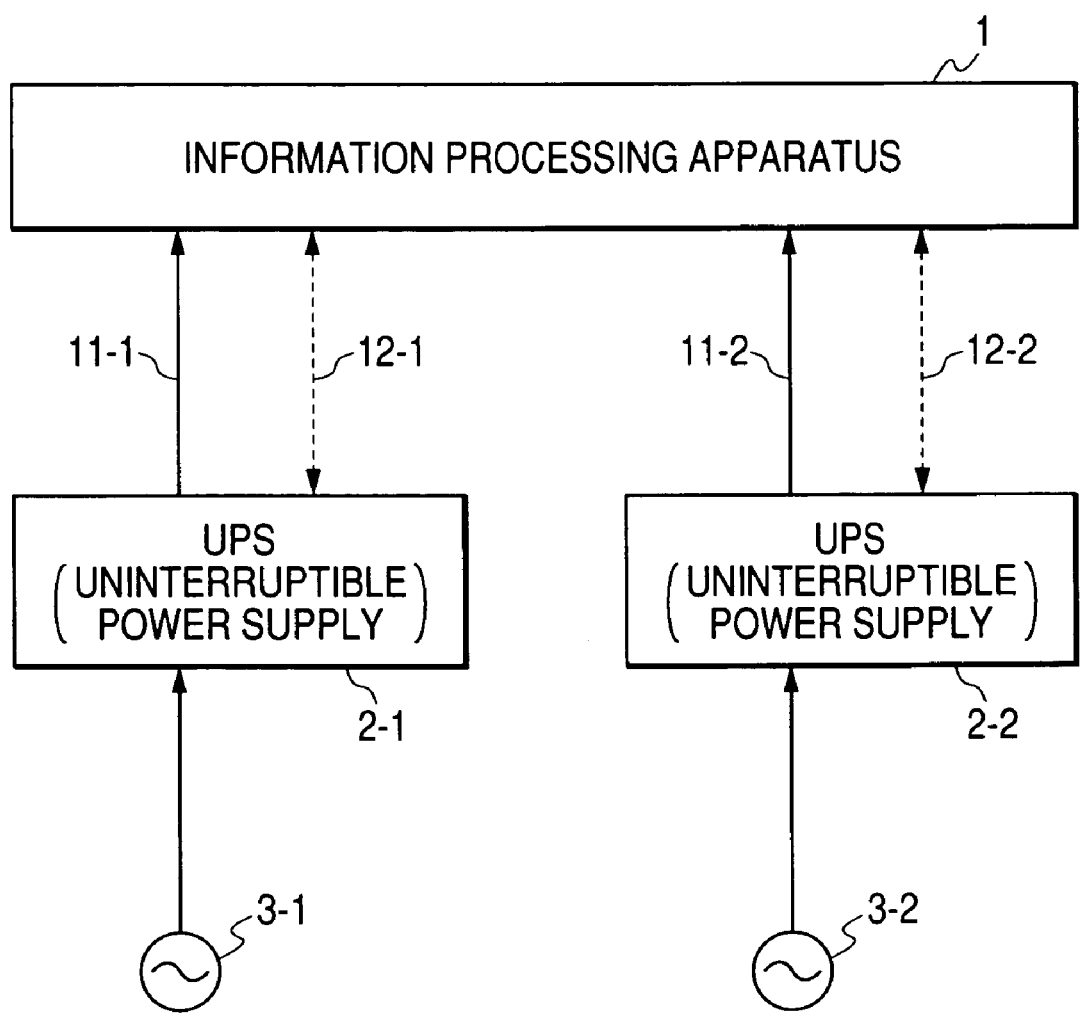
FIG. 1 is a block diagram showing an example configuration for one embodiment of an information processing system according to the present invention.

FIG. 1 is a diagram showing an example configuration according to one embodiment for the information processing system of the present invention.

As is shown in FIG. 1, the information processing system for the invention comprises: an information processing apparatus 1 and a plurality of UPSs (in FIG. 1, two UPSs, 2-1 and 2-2) connected to the information processing apparatus 1.

While referring to the configuration shown in FIG. 1, only one information processing apparatus 1 is employed as a component of the information processing system of the invention. However, so long as information processing apparatuses are interconnected via a network, an arbitrary number of apparatuses, i.e., two or more, may be employed. An information processing system for the invention constituted by two or more information processing apparatuses will be described later while referring to FIG. 6 and the following drawings.

The information processing apparatus 1 includes the redundant power supply function described above, i.e., the information processing apparatus 1 can employ electric power transmitted by the individual power supplies. Specifically, in the example shown in FIG. 1, the information processing apparatus 1 can employ electric power that is simultaneously transmitted by the two power supplies. Although not shown, commercial alternating current power sources 3-1 and 3-2 may be employed as these two power supplies.

Figure 2:
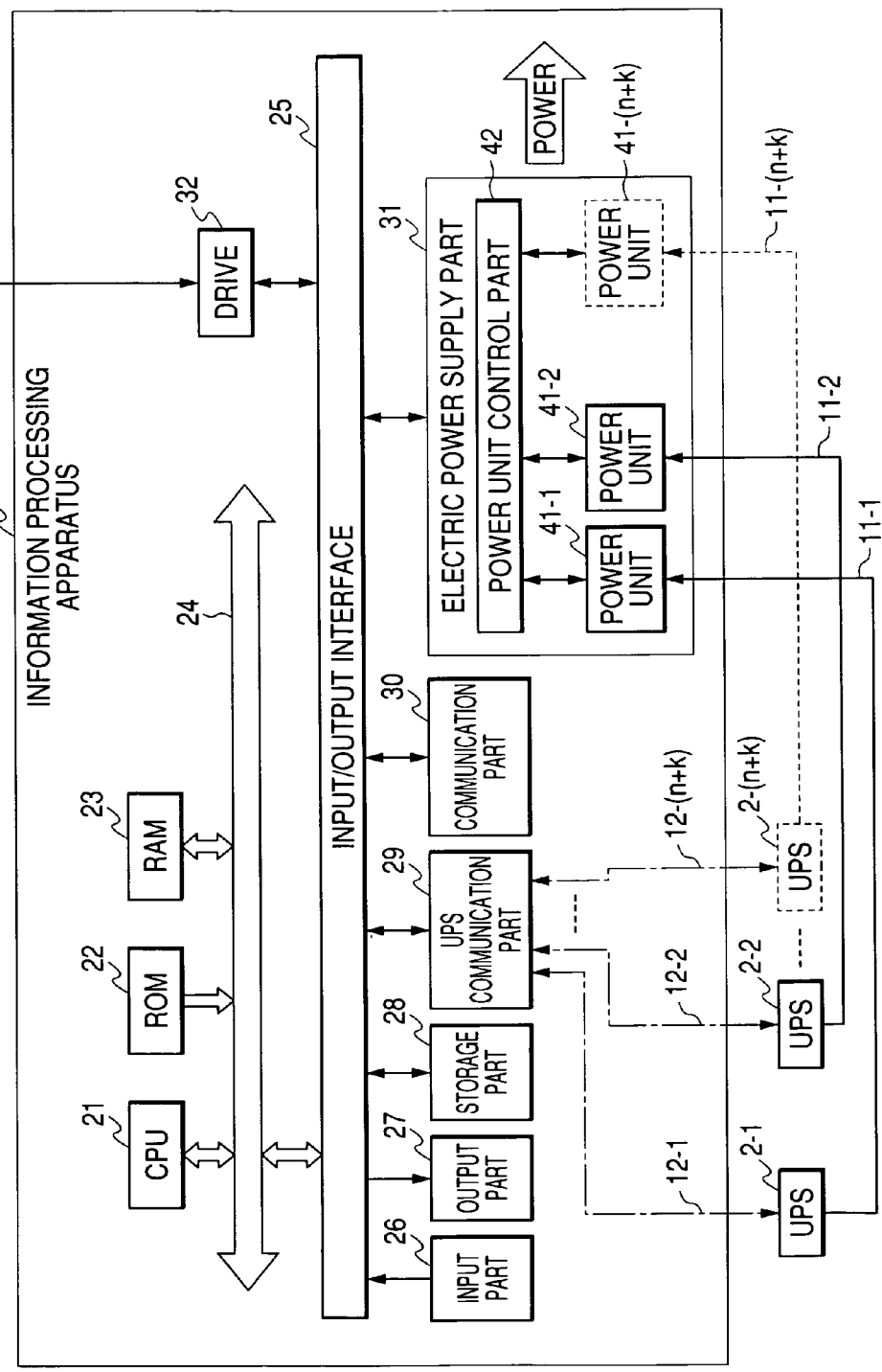
FIG. 2 is a block diagram showing an example configuration of an information processing apparatus included in the information processing system in FIG. 1, i.e., an example configuration of an information processing apparatus according to the present invention.

However, in this case, as is described above, when an abnormality occurs at either of the commercial alternating current power sources 3-1 or 3-2, e.g., when there occurs instantaneous lowering (instantaneous shutoff) or a sudden blackout, information currently being processed by the information processing apparatus 1 tends to be destroyed or lost, and the information processing apparatus 1 itself (e.g., a storage part 28 that is provided as a hard disk and that will be described later while referring to FIG. 2) tends to be damaged.

In order to avoid the occurrence of such malfunctions, in the example in FIG. 1, the UPS (Uninterruptible Power Supply) 2-1 is connected between the commercial alternating current power source 3-1 and the information processing apparatus 1, and the UPS (Uninterruptible Power Supply) 2-2 is connected between the commercial alternating current power source 3-2 and the information processing apparatus 1.

In other words, as input power sources for the information processing apparatus 1, the UPS 2-1 is connected to the information processing apparatus 1 by a power line 11-1, and the UPS 2-2 is connected by a power line 11-2.

When the commercial alternating current power source 3-1, which is an input power source, is operating normally, the UPS 2-1 supplies electric power from the commercial alternating current power source 3-1 to the information processing apparatus 1 across the power line 11-1. But when an abnormality occurs at the commercial alternating current power source 3-1, which is the input power source, the UPS 2-1 supplies electric power from its incorporated battery (a battery 75, in FIG. 4, that will be described later) to the information processing apparatus 1 via the power line 11-1.

Similarly, when the commercial alternating current power source 3-2, which is an input power source, is operating normally, the UPS 2-2 supplies electric power from the commercial alternating current power source 3-2 to the information processing apparatus 1 across the power line 11-2. And when an abnormality occurs at the commercial alternating current power source, which is an input power source, the UPS 2-2 supplies electric power from its incorporated battery (the battery 75, in FIG. 4, that will be described later) to the information processing apparatus 1 across the power line 11-2.

The information processing apparatus 1 is also connected to the UPS 2-1 by a communication line 12-1, and to the UPS 2-2 by a communication line 12-2. That is, the information processing apparatus 1 can independently perform communication with the UPS 2-1 via the communication line 12-1, or with the UPS 2-2 via the communication line 12-2 (can exchange information with the UPSs 2-1 and 2-2).

The communication methods that are employed are not especially limited, and in this embodiment, either a wire or a wireless serial communication method that conforms to the RS-232C standards or the USB (Universal Serial Bus) standards is employed. When the wire serial communication method is employed, the communication lines 12-1 and 12-2 conform to the serial communication standards, and when the wireless serial communication method is employed, the communication lines 12-1 and 12-2 are wireless.

So long as the information processing apparatus 1 has the redundant power supply function (i.e., can be connected to a plurality of UPSs), and can exchange information with individually connected UPSs (the UPSs 2-1 and 2-2 in the example in FIG. 1), the configuration is not especially limited, and various arrangements may be employed. Specifically, although not shown, the information processing apparatus 1 can, for example, be a controller, such as a PLC (Programmable Logic Controller), or an electric home appliance.

In this embodiment, a computer, as shown in FIG. 2, for example, is employed as the information processing apparatus 1.

That is, an example configuration for the information processing apparatus 1 of the invention is shown in FIG. 2.

In the information processing apparatus 1 in FIG. 2, a CPU (Central Processing Unit) 21 performs various processing in accordance with a program stored in a ROM (Read Only Memory) 22 or a program loaded from the storage part 28 to a RAM (Random Access Memory) 23. Data the CPU 21 requires to perform various processing are also stored in the RAM 23 as needed.

Specifically, a UPS monitoring part 51, a shutdown control part 52 and a UPS control part 53 in FIG. 3, which will be described later, can be provided as programs. The CPU 11 executes these programs to perform the functions of the UPS monitoring part 51, the shutdown control part 52 and the UPS control part 53 in FIG. 3.

The CPU 21, the ROM 22 and the RAM 23 are interconnected by a bus 24. An input/output interface 25 is also connected to this bus 24.

An input part 26, such as a keyboard or a mouse, an output part 27, such as a display, and the storage part 28, such as a hard disk, are connected to the input/output interface 25.

A UPS communication part 29, a communication part 30 and a electric power supply part 31, for transmitting to the information processing apparatus 1 electric power received from an externally power source, are also connected to the input/output interface 25.

The UPS communication part 29 is, for example, a communication board or a communication card that conforms to the wireless or the wire, serial communication method, and controls communications with the UPS 2-1 to the UPS 2-($n+k$) connected as input electric sources to the information processing apparatus 1 (n and k are integer values; how they relate to each other will be described later).

Figure 6:
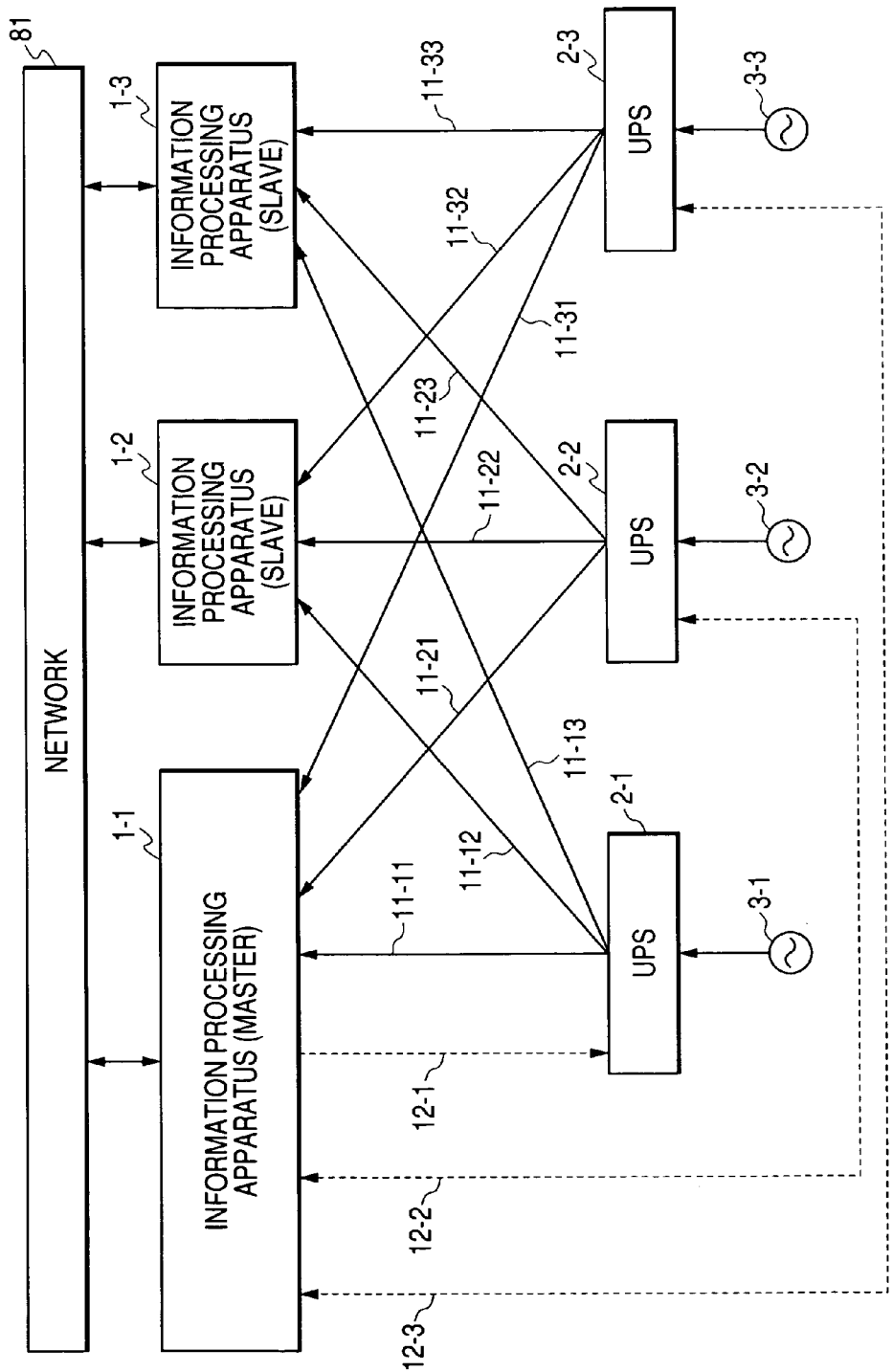
FIG. 6 is a block diagram showing an example configuration for another embodiment of the information processing system according to the present invention.

The communication part 30 is, for example, a modem or a terminal adaptor for controlling communication with another information processing apparatus across a network. Specifically, as is shown in FIG. 6, which will be referred to later, the communication part 30 is connected to a network 81 to control the communication with another information processing apparatus (e.g., for a communication part 30 of a information processing apparatus 1-1, or a information processing apparatus 1-2 or 1-3). The communication method employed by the communication part 30 is also not especially limited, and either a wire or a wireless communication method can be employed.

The electric power supply part 31 has a redundant power supply function, and collectively transmits electric power received from the input power sources to the individual sections of the information processing apparatus 1. That is, in FIG. 2, electric power provided by the electric power supply part 31 is indicated by a white arrow. However, in actuality, the electric power supply part 31 is connected to the individual sections of the information processing apparatus 1, and separately applies a DC voltage to the individual sections of the information processing apparatus 1 at corresponding levels.

More specifically, the electric power supply part 31 includes n+k power units 41-1 to 41-($n+k$) and a power unit control part 42 for controlling these power units.

Predetermined input power sources (in the example in FIG. 2, the UPSs 2-1 to 2-($n+k$)) are connected to the power units 41-1 to 41-($n+k$) via the power lines 11-1 to 11-($n+k$). That is, the power units 41-1 to 41-($n+k$) transform an AC voltage received from the predetermined input power sources into a DC voltage at a predetermined level, and output the DC voltage.

When the power units 41-1 to 41-($n+k$) are simply connected in parallel, in actuality, the output voltage level does not match, and accordingly, load currents (output currents) output by the power units 41-1 to 41-($n+k$) do not match, i.e., in the load currents a balance can not be obtained. Therefore, as a problem, stress due to the temperature, the voltage and the current is concentrated on the power unit 41-1 to 41-($n+k$), which output voltages at the highest levels.

In order to resolve this problem, the power unit control part 42 equally divides the load imposed on the power units 41-1 to 41-($n+k$) (this processing is hereinafter referred to as an equal load allotment process).

Furthermore, the power unit control part 42 continually monitors the power units 41-1 to 41-($n+k$). Thus, when an abnormality occurs at one, at least, of the power units, the power unit 41-1, for example, the power unit control part 42 permits the remaining power units 41-2 to 41-($n+k$) to supply the required electric power to the information processing apparatus 1 (this processing is referred to as a redundant power supply process).

The function for performing the redundant power supply process is generally called an n+k redundant power supply function. According to the n+k redundant power supply function, so long as at least n out of n+k power units 41-1 to 41-($n+k$) are operating normally, the entire system (the electric power supply part 31 in this case) is operated in the normal state (wherein the power normally used for operating the information processing apparatus 1 can be supplied). This function may be called "n out of n+k" (the redundant power supply function).

The minimum number of power units required to normally operate the information processing apparatus 1, i.e., n is determined in accordance with the specification for the electric power consumed by the information processing apparatus 1 and the specification for the power units. In this embodiment, n=1 is employed unless otherwise specifically designated. In the following explanation, it is assumed that the information processing apparatus 1 can normally be operated by only one power unit 41-1, unless otherwise specifically defined.

k is basically an arbitrary integer value, and in the example in FIG. 1 (or FIG. 3), n=k=1, while in the example in FIG. 6, which will be described later, n=1 and k=2.

A drive 32 is connected, as needed, to the input/output interface 25 and a removable computer readable medium 33, such as a magnetic disk, an optical disk, a magneto-optical disk or a semiconductor memory, is appropriately loaded into the drive 32, and a computer program is read from the loaded disk and installed in the storage part 28, as needed.

Figure 3:
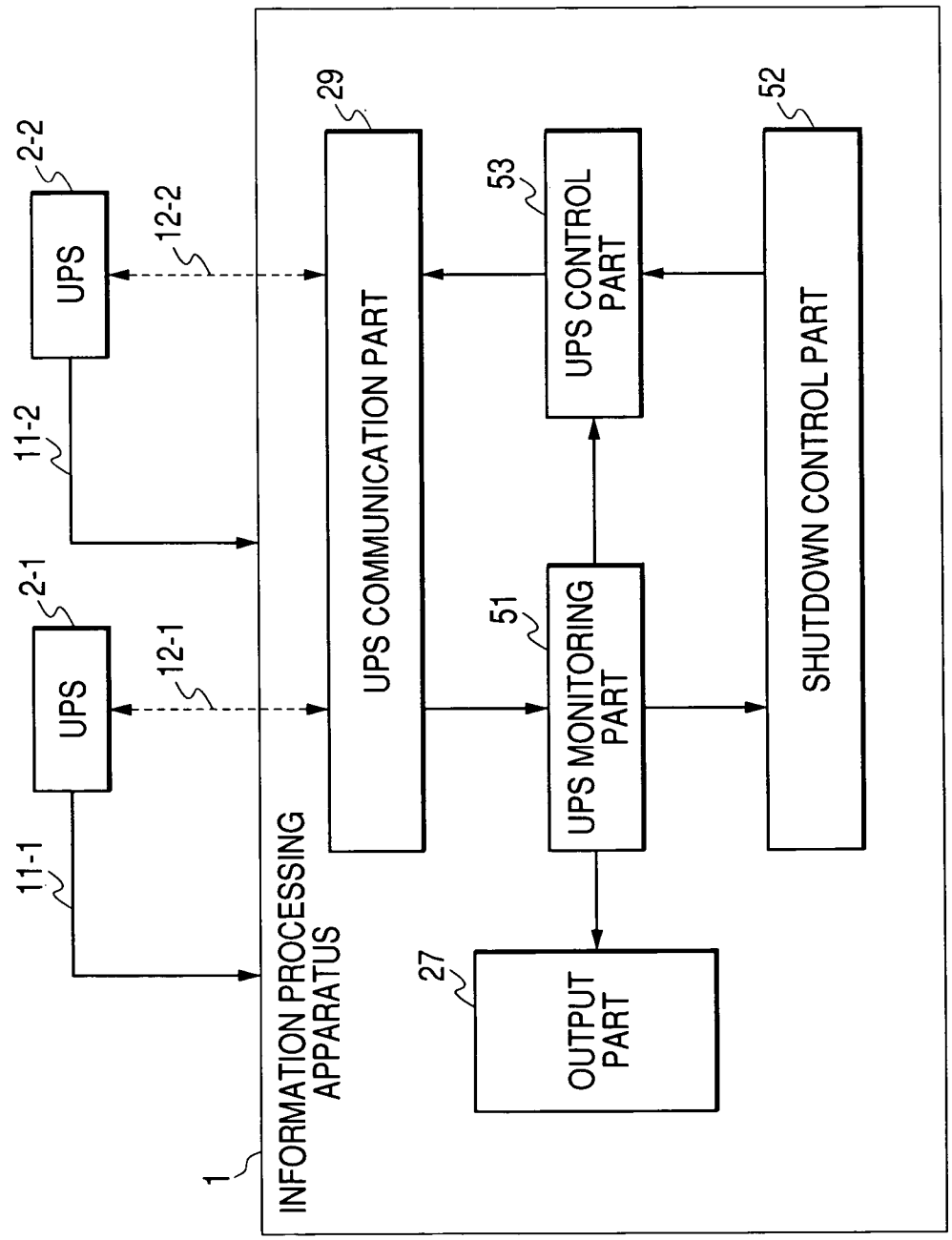
FIG. 3 is a block diagram for explaining the functions of the information processing apparatus in FIG. 2 that employs the present invention.

FIG. 3 is a block diagram showing one of the functions of the information processing apparatus 1, i.e., a function for monitoring the states of the UPSs connected as input power sources (in the example in FIG. 3, as well as in the example in FIG. 1, when n=k=1 in FIG. 2 is employed, the UPS 2-1 and the UPS 2-2 are connected), and for performing the shutdown processing or the UPS stop processing in accordance with the monitoring results.

As is shown in FIG. 3, this function can be provided by the hardware in FIG. 2, such as the output part 27 and the UPS communication part 29, and the software components, such as the UPS monitoring part 51, the shutdown control part 52 and the UPS control part 53, that are executed by the CPU 21 in FIG. 2.

In this embodiment, since the information processing apparatus 1 of the invention is a computer constituted as is shown in FIG. 2, the UPS monitoring part 51, the shutdown control part 52 and the UPS control part 53 are provided by using software. However, all or part of these components may be provided by hardware, or by a hardware and software combination. In this case, a hardware block is additionally provided for the configuration of the information processing apparatus 1 in FIG. 2.

Based on a variety of information that is transmitted by the UPSs 2-1 to 2-2 to the UPS communication part 29, the UPS monitoring part 51 monitors the states of the individual UPSs 2-1 to 2-2, and transmits the monitoring results to the output part 27, the shutdown control part 52 and the UPS control part 53.

Then, the output part 27 outputs the monitoring results obtained by the UPS monitoring part 51, and the shutdown control part 52 controls the shutdown processing based on the monitoring results. The UPS control part 53 generates control information for controlling the state of at least one of the UPSs 2-1 and 2-2, and permits the UPS communication part 29 to transmit the control information to the UPS 2-1 or 2-2 (or the UPSs 2-1 and 2-2) that is to be controlled.

Specifically, as will be described later, the UPSs 2-1 and 2-2 transmit to the information processing apparatus 1 information indicating whether they are currently operating (running) or stopped Further, when an abnormality occurs, the UPSs 2-1 and 2-2 transmit to the information processing apparatus 1 information indicating that an abnormality has occurred.

Roughly, two types of information are used to indicate an abnormality: information indicating an abnormality at the UPS itself (e.g., an abnormality at the battery 75 in FIG. 4, which will be described later), and information indicating an abnormality at the input power source (in this case, as is shown in FIG. 1, the input power source for the UPS 2-1 is the commercial alternating current power source 3-1, and the input power source for the UPS 2-2 is the commercial alternating current power source 3-2).

Information of the second type that is used to indicate an abnormality, i.e., information indicating an abnormality at the input power source, is referred to as "input power source abnormality" information.

When, for example, both of the UPSs 2-1 and 2-2 transmit information indicating their operating (running) state along with "input power source abnormality" information, the UPS monitoring part 51 transmits monitoring results to the shutdown control part 52 indicating that abnormalities have occurred at the input power sources (the commercial alternating current power sources 3-1 and 3-2 in this embodiment) for both UPSs, 2-1 and 2-2.

The monitoring results are also simultaneously transmitted to the UPS control part 53. The processing performed by the UPS control part 53 at this time will be described later.

When abnormalities occur at the input power sources (the commercial alternating current power sources 3-1 and 3-2 in this embodiment) for the UPSs 2-1 and 2-2, both UPSs employ batteries to supply electric power. Therefore, when the information processing apparatus 1 continues to perform a processing that is currently running, the discharge of the batteries in the UPSs 2-1 and 2-2 continues, until finally, the supply of power to the information processing apparatus 1 is disabled, i.e., the output of a voltage at a level satisfying the specifications is disabled. As a result, the electric power required for a normal operation can not be supplied to the information processing apparatus 1, so that information that is currently being processed is destroyed or lost and the information processing apparatus 1 (the storage part 28 in FIG. 2, a hard disk) is damaged.

In order to resolve this problem, when the shutdown control part 52 receives such monitoring results, i.e., when abnormalities have occurred at the input power sources (in this case, the commercial alternating current power sources 3-1 and 3-2) for both the UPSs 2-1 and 2-2, the shutdown control part 52 initiates the shutdown processing.

More specifically, during the shutdown processing the shutdown control part 52 stops the processing currently being performed by the information processing apparatus 1, and in accordance with predetermined procedures, shifts the operating state of the information processing apparatus 1 to a state that is not affected by the cutoff of the electric power supplied by the electric power supply part 31 (FIG. 2). Specifically, since the information processing apparatus 1 is constituted as the computer shown in FIG. 2, the information processing apparatus 1 frequently executes application software that runs on a predetermined OS. In this case, as part of the shutdown processing, the shutdown control part 52 first stores all required data and then deactivates the application software and the OS.

On the other hand, when both the UPSs 2-1 and 2-2 transmit information indicating their operating (running) states, and when one of the UPSs 2-1 and 2-2 (e.g., the UPS 2-1) transmits "input power source abnormality" information, the UPS monitoring part 51 transmits to the shutdown control part 52 monitoring results indicating that an abnormality has occurred at the input electric source (the commercial alternating current power source 3-1 in this case) for the UPS 2-1 and that the input electric source for the UPS 2-2 is operating normally.

Since, as is described above, at least one of the UPSs 2-1 and 2-2 is operating normally and the electric power supply part 31 can provide sufficient power for the normal operation of the information processing apparatus 1, the shutdown processing is not required and the shutdown control part 52 inhibits its performance (does not permit the shutdown processing to be performed).

Accordingly, the information processing apparatus 1 does not have to abort processing that currently is being performed (the performance of an unnecessary shutdown processing can be avoided).

When the shutdown control part 52 determines that the shutdown processing should be performed, it transmits to the UPS control part 53 its scheduled remaining processing period (a scheduled period that continues until the processing has been completed).

That is, when the shutdown processing is initiated, the scheduled remaining processing period for the shutdown control part 52 is the period that is required to complete the shutdown processing. Therefore, when the shutdown control part 52 determines the shutdown processing is required (and before the shutdown processing is initiated), it transmits to the UPS control part 53 information indicating the period the shutdown processing will require. In the following explanation, the shutdown processing is actually performed in advance and the period required for the performance of the processing is measured, and a period (referred to as a designated period) obtained by adding the measured period to a predetermined grace period is defined as the period required for the shutdown processing. Then, when the shutdown control part 52 determines the shutdown processing is required (and before the shutdown processing is performed), the shutdown control part 52 transmits to the UPS control part 53 information indicating the length of this designated period.

On the other hand, when it is determined the performance of the shutdown processing should be inhibited, the shutdown control part 52 terminates the processing immediately after making this determination. Therefore, the scheduled remaining processing period for the shutdown control part 52 is "0". And thus, when the shutdown control part 52 determines that the performance of the shutdown processing is inhibited, it transmits a "0" to the UPS control part 53.

The processing (function) of the shutdown control part 52 has been explained for when the two UPSs 2-1 and 2-2 are connected to the information processing apparatus 1, i.e., for when the information processing apparatus 1 has the 1+1 redundant power supply function.

As is shown in FIG. 2, which has been referred to, the information processing apparatus 1 may include an n+k redundant power supply function, i.e., n+k UPSs 2-1 to 2-(n+k) may be connected to the information processing apparatus 1.

In this case, i.e., when the information processing apparatus 1 includes the n+k redundant power supply function, the processing (function) for the shutdown control part 52 is performed as follows.

When an abnormality has occurred at the input power source of at least one of the UPSs 2-1 to 2-(n+k) connected to the information processing apparatus 1 (i.e., at least one UPS outputs "input power source abnormality" information), and when the UPS monitoring part 51 determines that the number of UPSs for which the input power sources are normally operated is smaller than n, the shutdown control part 52 initiates the shutdown processing. But when other monitoring results are obtained, the shutdown control part 52 inhibits the shutdown processing, i.e., the operating state of the information processing apparatus 1 is maintained.

When the shutdown control part 52 determines the shutdown processing must be performed (but before the shutdown processing is initiated), it transmits information indicating the designated period to the UPS control part 52. But when the shutdown control part 52 determines the performance of the shutdown processing is inhibited, it transmits information containing a "0" to the UPS control part 53.

As is described above, since the shutdown control part 52 is provided for the information processing apparatus 1 of the invention, the following problems can be resolved.

Assume that, as is described above, an abnormality has occurred at the input power source for at least one of the n+k UPSs 2-1 to 2-($n+k$) (UPSs 2-1 and 2-2 in the example in FIG. 3 because n=k=1 is employed) that are input power sources for the information processing apparatus 1 having the n+k redundant power supply function, and that as a result, the number of UPSs for which the input power sources are normally operated is smaller than n (e.g., in the example in FIG. 3, the UPSs 2-1 and 2-2 are either in a state wherein the input power sources are not normally operated, i.e., in a state wherein electric power is being supplied by the batteries, or in the stopped state).

At this time, when the information processing apparatus 1 continues the current processing the discharging of the battery is continued for the UPS 2-$o$ ($o$ is one of integers 1 to n+k, and may be plural; that is, abnormalities may occur at the input power sources for a plurality of UPSs) for which the abnormality has occurred at the input power source (i.e., for which the power is being supplied by the battery). As a result, electric power supplied by the UPS 2-$o$ to the information processing apparatus 1 is disabled, i.e., a voltage at a level that satisfies the specifications can not be output. That is, the number of UPSs 2-1 to 2-($n+k$) that can supply electric power to the information processing apparatus 1 is substantially smaller than n. As a result, the electric power required for a normal operation is not supplied to the information processing apparatus 1, and information currently being processed is destroyed or lost. Further, the information processing apparatus 1 (e.g., the storage part 28 in FIG. 2, such as a hard disk) is damaged.

To resolve this problem, for the information processing apparatus 1 of the embodiment, the shutdown control part 52 is provided to reliably perform the shutdown processing.

When abnormalities have occurred at the input power sources for some of the UPSs 2-1 to 2-($n+k$) that are connected to the information processing apparatus 1 and are in an operating state, and when the number of the UPSs for which the input power sources are normally operated is n or greater, the shutdown control part 52 inhibits the performance of the shutdown processing. Therefore, the information processing apparatus 1 can continue the current processing, i.e., the performance of an unnecessary shutdown processing can be avoided.

When the UPS monitoring part 51 determines that abnormalities have occurred at the input power source for at least one of the UPSs 2-1 to 2-($n+k$) connected to the information processing apparatus 1, i.e., when at least one UPS transmits "input power source abnormality" information, the UPS control part 53 generates, as control information, an instruction to perform the UPS stop processing, i.e., a processing for shifting the operating state of the UPS wherein electric power is output to the stopped state wherein the output is stopped This instruction is thereafter referred to as a stop instruction.

When the UPS control part 53 receives information indicating a scheduled remaining period for the processing performed by the shutdown control part 52, the UPS control part 53 adds to the stop instruction an instruction that the UPS stop processing should be executed at a timing, after the scheduled remaining period has elapsed, following the transmission of the stop instruction. Specifically, when the shutdown processing is to be performed, the instruction includes contents indicating that the UPS stop processing is to be performed after the designated period has elapsed following the transmission of the stop instruction, and when the shutdown processing is not to be performed, the instruction includes contents indicating that the UPS stop processing should be performed immediately after the stop instruction is received. The UPS control part 53 permits the UPS communication part 29 to transmit the resultant stop instruction to the UPSs 2-1 to 2-($n+k$) that transmitted the "input power supply abnormality" information.

The stop instruction is thus issued through the UPS communication part 29 to the UPSs 2-1 to UPS 2-($n+k$) that transmitted the "input power source abnormality" information (for the occurrence of abnormalities at the input power sources) Then, the UPS stop processing is performed at the timing designated by the stop instruction (i.e., the timing following the elapse of the scheduled remaining period after the stop instruction is received; specifically, when the shutdown processing is to be performed, the timing following the elapse of the designated period, or, when the shutdown processing is not to be performed, the timing immediately after the stop instruction is received). As a result, the states of the UPSs 2-1 to 2-($n+k$) that transmitted the "input power source abnormality" information (for the occurrence of abnormalities at the input power sources) are changed from the operating to the stopped state.

As is described above, since the UPS control part 53 is provided for the information processing apparatus 1 of the embodiment, when the UPSs 2-1 to 2-($n+k$) are connected to the input power sources for the information processing apparatus 1, the information processing apparatus 1 can control the individual UPSs 2-1 to 2-($n+k$) without another controller.

Specifically, the UPS control part 53 performs the UPS stop processing for the UPSs 2-1 to 2-($n+k$) for which abnormalities occurred at the input power sources (performs the control of transmitting the stop instruction). Therefore, it is possible to prevent the unnecessary discharge of a battery (e.g., the battery 75 in FIG. 4, which will be described later) that is incorporated in a UPS for which an abnormality occurred at the input power source (a UPS that is supplying electric power from the battery). As a result, the deterioration (the reduction in the service life) of the battery can be avoided.

When the information processing apparatus 1 (the shutdown control part 52) performs the shutdown processing, none of the UPSs 2-1 to 2-($n+k$) need to supply electric power to the information processing apparatus 1, so that the UPS control part 53 may transmit the stop instruction to all the UPSs 2-1 to 2($n+$k).

Figure 4:
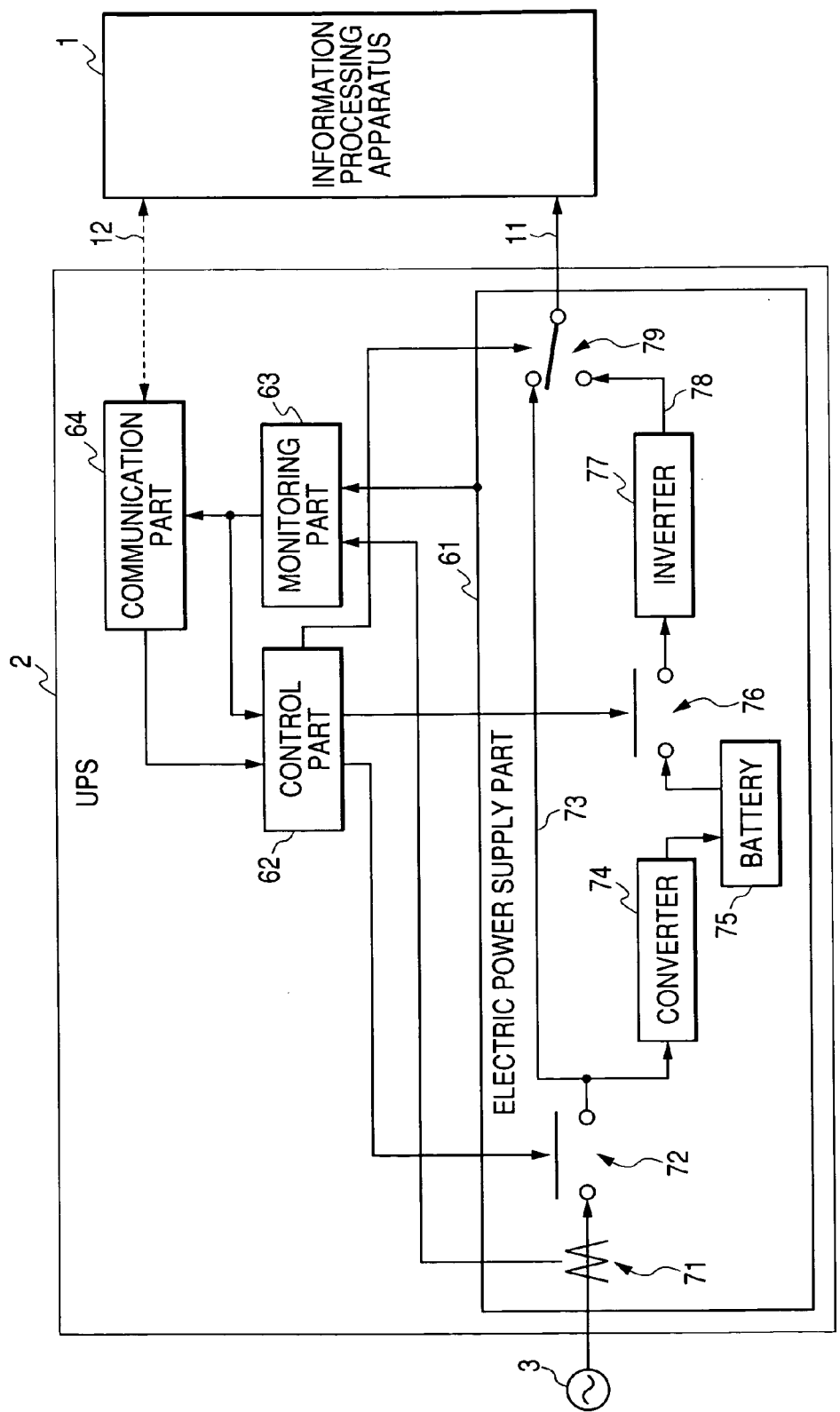
FIG. 4 is a block diagram showing an example configuration for a UPS (Uninterruptible Power Supply) included in the information processing apparatus in FIG. 1.

FIG. 4 is a diagram showing an example arrangement for each of the UPSs 2-1 to 2-($n+k$) connected to the information processing apparatus 1 shown in FIG. 1 or 2.

In the following explanation, the UPSs 2-1 to 2-($n+k$) are referred to simply as the UPS 2, unless a separate explanation must be given. Similarly, unless a separate explanation must be given, the commercial alternating current power sources 3-1 and 3-($n+k$) which are input power sources for USP 2-1 and 2-($n+k$), respectively are referred to simply as the commercial alternating current power sources 3 (the commercial alternating current power sources 3-1 and 3-2 are shown in FIGS. 1 and 6, the commercial alternating current power source 3-3 is shown in FIG. 6, and the commercial alternating current power sources 3-4 to 3-($n+k$) are not especially shown). Likewise, the power lines 11-1 to 11-($n+k$) are referred to simply as the power lines 11, and the communication lines 12-1 to 12-($n+k$) are referred to simply as the communication lines 12.

As is shown in FIG. 4, the UPS 2 includes a electric power supply part 61, a control part 62, a monitoring part 63 and a communication part 64.

The commercial alternating current power source 3 is connected to the input terminal of the electric power supply part 61, and the information processing apparatus 1 is connected to the output terminal by the power line 11. That is, when the commercial alternating current power source 3, which is an input power source, is in the normal operating state, the electric power supply part 61 transmits the electric power from the commercial alternating current power source 3 to the information processing apparatus 1. When an abnormality has occurred at the commercial alternating current power source 3, the electric power supply part 61 supplies electric power from the incorporated battery 75 to the information processing apparatus 1.

In the example shown in FIG. 4, for the sake of convenience, a so-called firm commercial power service system is employed as the power supply system (configuration) for the electric power supply part 61. However, the system is not limited to that shown in FIG. 4, and various systems such as a so-called line interactive system or a so-called fixed inverter system can be employed. Further, although not shown, another component, such as a filter, may be provided so that a voltage having a waveform closer to a sine wave can be applied to the information processing apparatus 1.

In the electric power supply part 61 in FIG. 4, a detector 71, which is, for example, a detection resistor, detects the state, such as the voltage level, of the commercial alternating current power source 3, which is an input power source, and transmits the detection results to the monitoring part 63.

The state of a switch 72 is changed by the control part 62. That is, when, for example, the commercial alternating current power source 3, which is an input power source, is in the normal state, the control part 62 changes the state of the switch 72 to the ON state in order to shift the state of the UPS 2 to the operating state wherein electric power is output. On the other hand, the control part 62 changes the state of the switch 72 to the OFF state in order to shift the state of the UPS 2 to the stopped state, for example, wherein the output of electric power is inhibited.

A line 73 is used to feed electric power from the commercial alternating current power source 3. As will be described later, when the commercial alternating current power source 3 is in the normal state, i.e., is operating normally, the input terminal of a switch 79 is changed to the line 73 side by the control part 62, and the electric power from the commercial alternating current power source 3 is supplied to the information processing apparatus 1 along the line 73, the switch 79 and the power line 11. Hereafter, the line 73 is referred to as the common line 73 in order to distinguish it from a line 78 that will be described later.

A converter 74 converts an AC voltage supplied by the commercial alternating current power source 3 into a DC voltage at a predetermined level, and applies the DC voltage to the battery 75. That is, focusing on the battery 75, the converter 74 serves as the charger for the battery 75, and transmits a charge current to the battery 75.

The battery 75 is a spare power source (backup electric power source) that supplies electric power to the information processing apparatus 1 when an abnormality has occurred at the commercial alternating current power source 3. That is, when an abnormality occurs at the commercial alternating current power source 3, the control part 62 changes the state of the switch 76 to the ON state, and sets the input terminal of the switch 79 to the line 78 side (battery 75 side). Then, the discharge of the battery 75 is begun, and a DC voltage at a predetermined level is applied to an inverter 77.

The state of the switch 76 is changed by the control part 62. That is, when the UPS 2 is in the operating state, and when an abnormality has occurred at the commercial alternating current power source 3, the control part 62 changes the state of the switch 76 to the ON state. In the other cases, the control part 62 changes the state of the switch 76 to the OFF state.

The inverter 77 converts the DC voltage applied by the battery 75 into an AC voltage having the same frequency (50 Hz in and north of Kanto, or 60 Hz in and west of Kansai) and at substantially the same level as the electric power supplied by the commercial alternating current power source 3. The inverter 77 then applies the obtained AC voltage to the information processing apparatus 1 through the line 78, the switch 79 and the power line 11.

The line 78 is used to feed electric power from the battery 75. Hereafter, the line 78 is referred to as the backup line 78 in order to distinguish it from the common line 73.

As is described above, the input terminal of the switch 79 is changed by the control part 62. That is, when the UPS 2 is in the operating state and when an abnormality has occurred at the commercial alternating current power source 3, the control part 62 changes the input terminal of the switch 79 to the backup line 78 side. In all other cases, the control part 62 changes the input terminal of the switch 79 to the common line 73 side.

Based on the information, such as the stop instruction, that is transmitted by the information processing apparatus 1 to the communication part 64, or based on the monitoring results obtained by the monitoring part 63, the control part 62 controls the states of the switches 72 and 76 and the state of the input terminal of the switch 79 as described above.

Specifically, when the commercial alternating current power source 3 is in the normal state and the UPS 2 is to be shifted to the operating state, the control part 62 changes the switch 72 to the ON state, and the input terminal of the switch 79 to the common line 73 side. Through this processing, as described above, electric power is supplied from the commercial alternating current power source 3 to the information processing apparatus 1 through the electric power supply part 61 and the power line 11. It should be noted that, at this time, the control part 62 may change the state of the switch 76 to the OFF state.

Furthermore, when the monitoring part 63 determines that an abnormality has occurred at the commercial alternating current power source 3, i.e., when the "input power source abnormality" information generated by the monitoring part 63 is transmitted to the communication part 64 and to the control part 62, the control part 62 changes the switch 76 to the ON state, and the input terminal of the switch 79 to the backup line 78 side. Through this processing, as is described above, electric power (backup electric power) is supplied from the battery 75 to the information processing apparatus 1 along the power line 11. It should be noted that, at this time, the control part 62 may change the switch 72 to the OFF state.

Under these conditions, when the communication part 64 receives the stop instruction from the information processing apparatus 1, and transmits the stop instruction to the control part 62, the control part 62 changes the switches 72 and 76 to the OFF state after the "scheduled remaining period" for the processing for the shutdown control part 52 (FIG. 3), which is included in the stop instruction, has elapsed following the reception of this instruction. Specifically, when the shutdown processing is to be performed by the information processing apparatus 1, the control part 62 changes the switches 72 and 79 to the OFF state after the designated period has elapsed (the shutdown processing has been completed). When the shutdown processing is not performed by the information processing apparatus 1, the control part 62 changes the switches 72 and 76 to the OFF state immediately after the stop instruction is received. Through this processing, the supply of electric power from the UPS 2 to the information processing apparatus 1 is stopped i.e., the UPS 2 inhibits the output of electric power. In other words, upon receiving the stop instruction from the information processing apparatus 1, the control part 62 performs the UPS stop processing by which the operating state of the UPS 2 is shifted to the stopped state.

The monitoring part 63 not only monitors the state of the UPS 2, such as the electric power supply part 61, but also employs the detection results obtained by the detector 71 to monitor the state of the commercial alternating current power source (input power source) 3. Then, the monitoring part 63 transmits the monitoring results to the control part 62 and the communication part 64. For example, when the monitoring part 63 determines that an abnormality has occurred at the UPS 2 or the commercial alternating current power source 3, the monitoring part 63 generates information indicating the type of abnormality, e.g., the "input power source abnormality" information is output when the abnormality occurred at the commercial alternating current power source 3, and transmits this information to the control part 62 and the communication part 64.

The communication part 64 performs communication with the information processing apparatus 1 through the communication line 12. That is, the communication part 64 transmits the monitoring results received from the monitoring part 63 to the information processing apparatus through the communication line 12.

Further, the communication part 64 receives information, such as the stop instruction, from the information processing apparatus 1 through the communication line 12, and transmits the received information to the control part 62. In this embodiment, the communication system employed by the communication part 64 is a serial communication system described above.

Figure 5:
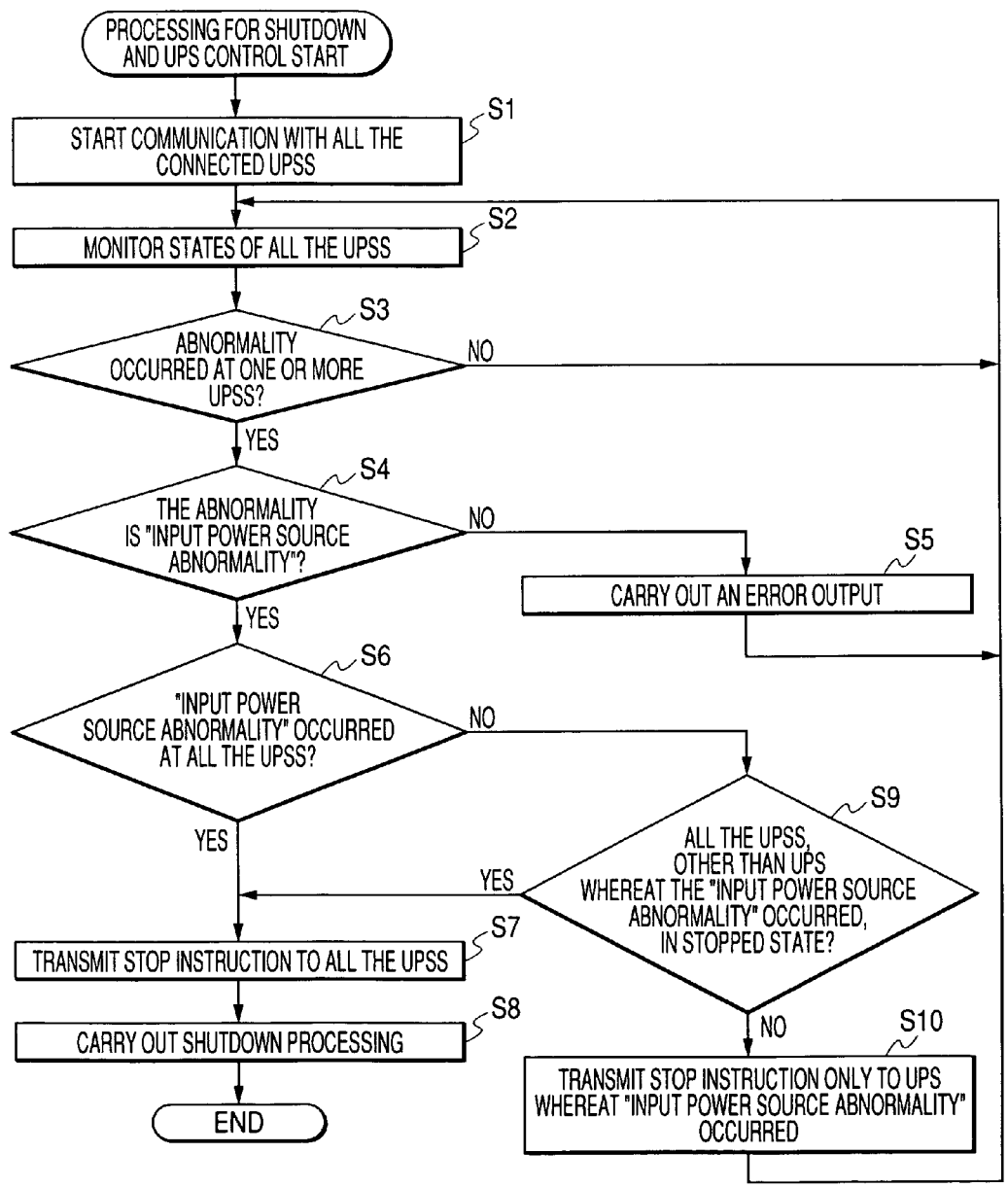
FIG. 5 is a flowchart for explaining the shutdown processing and UPS control processing performed by the information processing apparatus, in the information processing system in FIG. 1, that has a 1+k redundant power supply function.

FIG. 5 is a flowchart for explaining the processing performed when the information processing apparatus 1 in FIG. 2 (or FIG. 1) monitors the states of the UPSs 2-1 to 2-($n+k$) connected as input power sources, and performs the shutdown processing or the UPS stop processing in accordance with the monitoring results. This processing in FIG. 5 corresponds to the functional block diagram in FIG. 3, and is hereinafter referred to as shutdown processing and UPS control processing.

It should be noted that the shutdown processing and UPS control processing in FIG. 5 is performed by the information processing apparatus 1 that has a 1+k redundant power supply function (e.g., the 1+1 redundant power supply function shown in FIG. 1).

While referring to the flowchart in FIG. 5, an explanation will now be given for the shutdown processing and UPS control processing performed by the information processing apparatus 1 that has the 1+k redundant power supply function (e.g., the 1+1 redundant power supply function shown in FIG. 1).

The shutdown processing and UPS control processing in FIG. 5 is initiated when the following first to third conditions are established.

The first condition is the shift of the states of the UPSs 2-1 to 2-(1+k) connected to the information processing apparatus 1 to the operating states.

The second condition is the change of the state of the power switch (not shown) of the information processing apparatus 1 to the ON state, i.e., the start of the supply of electric power from the electric power supply part 31 (FIG. 2).

The third condition is the activation of the OS and the activation of application software that corresponds to the UPS monitoring part 51, the shutdown control part 52 and the UPS control part 53 in FIG. 3, i.e., the shifting of the states of the UPS monitoring part 51, the shutdown control part 52 and the UPS control part 53 to the states wherein the corresponding functions can be performed.

When the shutdown processing and UPS control processing is begun, first, at step S1, the UPS communication part 29 initiates communication with all the UPSs 2-1 to 2-(1+k) connected to the information processing apparatus 1.

In the following explanation, for the sake of convenience, two UPSs 2-1 and 2-2 are connected to the information processing apparatus 1, as is shown in FIG. 1 or 3, i.e., the information processing apparatus 1 includes the 1+1 redundant power supply function (an n+k redundant power supply function when n=k=1 is established).

At step S2, the UPS monitoring part 51 monitors the states of the two UPSs 2-1 to 2-2. More specifically, as is described above, since the UPSs 2-1 and 2-2 transmit to the UPS monitoring part 51 information indicating their own states or the states of the input power sources (the commercial alternating current power sources 3-1 and 3-2), the UPS monitoring part 51 employs the received information via the UPS communication part 29 to monitor the states of the UPSs 2-1 and 2-2 based on the information obtained.

At step S3, the UPS monitoring part 51 employs the monitoring results obtained at step S2 to determine whether an abnormality has occurred at one at least of the UPSs 2-1 and 2-2.

When the UPS monitoring part 51 determines that both UPSs 2-1 and 2-2 are in the normal state, i.e., when it is ascertained at step S3 that no abnormality has occurred at either UPSs 2-1 and 2-2, program control returns to step S2, and the processing is repeated. That is, the UPS monitoring part 51 continuously monitors the states of the individual UPSs 2-1 and 2-2.

When the UPS monitoring part 51 determines that one or both of the UPSs 2-1 and 2-2 are in an abnormal state, i.e., when it is ascertained at step S3 that an abnormality has occurred at one or more UPSs, at step S4, the UPS monitoring part 51 determines whether the abnormality is the "input power source abnormality".

When the abnormality is for the UPS 2 (e.g., an abnormality for the battery 75 in FIG. 4), i.e., when it is ascertained at step S4 that the abnormality is not the "input power source abnormality", at step S-5 the UPS monitoring part 51 outputs a predetermined error signal. Specifically, when the output part 27 is a display device, the UPS monitoring part 51 displays, on the display device, an image representing the type of abnormality. When the output part 27 is a loudspeaker, the UPS monitoring part 51 releases, through the loudspeaker, a sound representing the type of abnormality.

On the other hand, when the abnormality is the "input power source abnormality, i.e., when it is ascertained at step S4 that the abnormality is the "input power source abnormality", at step S6, the shutdown control part 52 determines whether the "input power source abnormality" has occurred at both the UPSs 2-1 and 2-2.

When it is determined at step S6 that the "input power source abnormality" has occurred at the UPSs 2-1 and 2-2, the shutdown control part 52 determines the shutdown processing is required, and transmits, to the UPS control part 53, information indicating the designated period.

The UPS control part 53 generates the stop instruction, and upon receiving the designated period information from the shutdown control part 52, adds to the stop instruction information indicating that the UPS stop processing should be executed after the designated period has elapsed. Then, the UPS control part 53 permits the UPS communication part 29 to transmit the resultant stop instruction to the UPSs 2-1 and 2-2. That is, at step S7, the UPS communication part 29 transmits the stop instruction to the UPSs 2-1 and 2-2.

After the designated period has elapsed following the reception of the stop instruction, the UPSs 2-1 and 2-2 perform the UPS stop processing during which the operating state wherein electric power is output is shifted to the stopped state wherein the output of electric power is inhibited.

Further, when it is ascertained at step S6 that the "input power source abnormality" has occurred at the two UPSs 2-1 and 2-2, at step S8 the shutdown control part 52 performs the shutdown processing.

Thereafter, the shutdown processing and UPS control processing is terminated.

On the other hand, when the "input power source abnormality" has occurred at only one of the UPS 2-1 or 2-2, i.e., it is ascertained at step S6 that the "input power source abnormality" has not occurred at both of the UPSs 2-1 and 2-2, at step S9 the shutdown control part 52 determines whether the state of the UPS 2, for which the "input power source abnormality" did not occur (i.e., in this embodiment, the UPS 2-2 when the "input power source abnormality" occurred at the UPS 2-1, or the UPS 2-1 when the "input power source abnormality" occurred at the UPS 2-2), is the stopped state.

That is, when all the UPSs 2, other than the UPS 2 for which the "input power source abnormality" occurred, are in the stopped state, e.g., when the "input power source abnormality" has occurred at the UPS 2-1 and the UPS 2-2 is in the stopped state, the UPS 2-1 for which the "input power source abnormality" occurred employs its incorporated battery 75 to supply backup electric power to the information processing apparatus 1.

Therefore, so long as the backup electric power is being supplied by the UPS 2-1, the information processing apparatus 1 having the 1+k (k=1 in this case) redundant power supply function can continue the current processing However, as is described above, the supply of backup electric power from the UPS 2-1 is limited, and as the discharging of the battery 75 is continued, the UPS 2-1 can not supply the necessary electric power to the information processing apparatus 1. In other words, the supply of electric power from the UPS 2-1 to the information processing apparatus 1 is suddenly cut off, and information currently being processed by the information processing apparatus 1 is destroyed or lost. In addition, the information processing apparatus 1 (e.g., the storage part 28 in FIG. 1, constituted by a hard disk) is damaged.

Furthermore, for the UPS 2-1 that supplies backup electric power, the unnecessary discharge of its incorporated battery 75 is performed, so that deterioration of the battery 75 (reduction of its service life) occurs.

To resolve these problems, at step S9, even when it is ascertained that all the UPSs 2, other than the UPS 2 for which the "input power source abnormality" has occurred, are in the stopped state, the shutdown control part 52 determines the shutdown processing is required, and transmits to the UPS control part 53 the information indicating the designated period.

The UPS control part 53 generates a stop instruction, and upon receiving the designated period information from the shutdown control part 52, adds to the stop instruction contents indicating that the UPS stop processing should be executed after the designated period has elapsed. Then, the UPS control part 53 permits the UPS communication part 29 to transmit the resultant stop instruction to the UPSs 2-1 and 2-2. That is, at step S7, the UPS communication part 29 transmits the stop instruction to the UPSs 2-1 and 202. At this time, since one of the UPSs 2-1 and 2-2 is already in the stopped state, this state is maintained, and after the designated period has elapsed, only the other UPS performs the UPS stop processing for shifting the operating state to the stopped state.

At step S8, the shutdown processing is also performed, and after this processing has been completed, the shutdown processing and UPS control processing is terminated.

On the other hand, when at least one of the UPSs 2-1 and 2-2 is in the operating state, and the input power source for this UPS is in the normal state, the pertinent UPS normally outputs power obtained from the corresponding commercial alternating current power source 3-1 or 3-2 that constitutes the input power source. Therefore, the information processing apparatus 1 having the 1+k (k=1 in this case) redundant power supply function can be operated normally, i.e., can continue the current process.

Therefore, when at least one of the UPSs 2-1 and 2-2 is in the operating state and the input power source for this UPS is in the normal state, i.e., when it is ascertained at step S9 that all the UPSs 2, other than the UPS 2 for which the "input power source abnormality" has occurred, are not in the stopped state, the shutdown control part 52 inhibits the shutdown processing, and transmits, to the UPS control part 53, information indicating this determination (information indicating that the scheduled remaining period for the processing of the shutdown control part 52 is "0").

However, since the information processing apparatus 1 continues the current processing unless the shutdown processing is performed, the UPS 2 (UPS 2-1 or 2-2) for which the "input power source abnormality" has occurred also employs its incorporated battery 75 to supply backup electric power. Therefore, for the UPS 2 for which the "input power source abnormality" has occurred, the unnecessary discharge of the incorporated battery 75 is performed, so that deterioration of the battery 75 (reduction of its service life) occurs.

In order to resolve this problem, upon receiving the information (indicating "0") from the shutdown control part 52, the UPS control part 53 adds to the previously generated stop instruction contents indicating that the UPS stop processing should be executed immediately after the stop instruction is received. Then, the UPS control part 53 permits the UPS communication part 29 to transmit the stop instruction to only the UPS 2 for which the "input power source abnormality" has occurred. That is, at step S10, the UPS communication part 29 transmits the stop instruction only to the UPS 2 for which the "input power source abnormality" has occurred.

When the UPS 2-1 or 2-2 for which the "input power source abnormality" has occurred receives the stop instruction, this UPS 2 performs the UPS stop processing to shift its state to the stopped state. The other UPS 2, for which the input power source is in the normal state and which is in the operating state, transmits, to the information processing apparatus 1, power obtained from the input power source (the commercial alternating current power source 3-1 or 3-2). As a result, the information processing apparatus 1 can continue its current process.

Thereafter, program control returns to step S2 and the above described processing is repeated.

The shutdown processing and UPS control processing performed by the information processing apparatus 1 having the 1+k redundant power supply function has been explained while referring to FIG. 5. For the information processing apparatus 1 having the n+k redundant power supply function, the shutdown processing and UPS control processing is performed basically in the same manner.

In this case, however, when it is determined at step S4 that the abnormality is the "input power source abnormality", instead of steps S6 and S9, the following processing is performed. The shutdown control part 52 determines whether the abnormality has occurred at the input power source for at least one of the UPSs 2-1 to 2-($n+k$) connected to the information processing apparatus 1, and whether the number of UPSs for which the input power sources are operating normally is smaller than n.

When it is determined that the abnormality has occurred at the input power source for at least one of the UPSs 2-1 to 2-($n+k$) connected to the information processing apparatus 1, and that the number of the UPSs 2 for which the input power sources are operating normally is smaller than n, the process beginning at step S7 is performed. In the other cases, the process beginning at step S10 is performed.

Furthermore, as is described above, when the information processing apparatus 1 performs the shutdown processing, i.e., when the process at step S8 is performed, none of the UPSs 2-1 to 2-($n+k$) need supply electric power to the information processing apparatus 1, so that the process at step S7 in FIG. 5 may be unchanged. However, in order to avoid deterioration of the battery of the UPS 2 for which the "input power source abnormality" has occurred, the process at step S7 may be replaced with the process, as well as the process at step S10, for transmitting the stop instruction only to the UPS 2 for which the "input power source abnormality" has occurred.

The information processing system wherein a single information processing apparatus is operated has been described as a information processing system according to the present invention. However, in many cases, a information processing apparatus is connected to another information processing apparatus by a network, and as is described above, the present invention can also be applied for a information processing system wherein a plurality of information processing apparatuses are interconnected by a network.

FIG. 6 is a diagram showing an example information processing system according to another embodiment of the present invention wherein a plurality of information processing apparatuses are interconnected by a network.

Specifically, for the information processing system according to this embodiment (which differs from that in FIG. 1), as is shown in FIG. 6, an arbitrary number of information processing apparatuses 1 (three information processing apparatuses 1-1 to 1-3 in FIG. 6) are interconnected by a network 81.

The information processing apparatuses 1-1 to 1-3 have an n+k redundant power supply function (in the example in FIG. 6, a 1+2 redundant power supply function for which n=1 and k=2; therefore, the information processing apparatuses 1-1 to 1-3 are connected to three UPSs 2-1 to 2-3, and n and k are not especially limited), and can communicate with a plurality of connected UPSs 2 (the UPSs 2-1 to 2-3 in FIG. 6). So long as these functions are available, various forms can be employed, and the information processing apparatuses 1-1 to 1-3 may each have different configurations.

In this embodiment, for the sake of convenience, the configuration shown in FIG. 2 is employed for all the information processing apparatuses 1-1 to 1-3.

Specifically, communication parts 30 of the information processing apparatuses 1-1 to 1-3 are connected to the network 81.

Further, in the information processing apparatus 1-$p$ ($p$ is an integer value of 1 to 3), the UPSs 2-1 to 2-3 are connected to power units 41-1 to 41-3 through power lines 11-1$p$ to 11-3$p$. With this arrangement, the UPSs 2-1 to 2-3, which employ commercial alternating current power sources 3-1 to 3-3 as input power sources, supply electric power to the information processing apparatuses 1-1 to 1-3.

In this case, the UPSs 2-1 to 2-3 communicate with only one of the information processing apparatuses 1-1 to 1-3 (the information processing apparatus 1 in the example in FIG. 6).

Hereinafter, the information processing apparatus 1-1 that communicates with the UPSs 2-1 to 2-3 is referred to as a master, and the information processing apparatuses 1-2 and 1-3 are referred to as slaves.

A UPS communication part 29 for the master 1-1 is connected to the UPS 2-1 by a communication line 12-1, to the UPS 2-2 by a communication line 12-2 and to the UPS 2-3 by a communication line 12-3. On the other hand, the slaves 1-2 and 1-3 are not connected by communication lines to the UPSs 2.

Since the master 1-1 and the slaves 1-2 and 1-3 have the same configuration, the functions shown in FIG. 3 are provided for the master 1-1 and the slaves 1-2 and 1-3. However, in this embodiment, all the functions are executed only by the master 1-1, and only the shutdown control part 52 function is performed by the slaves 1-2 and 1-3.

That is, the master 1-1 employs the function of a UPS monitoring part 51 to monitor the states of the UPSs 2-1 to 2-3, and employs the function of a UPS control part 53 to control the states of the UPSs 2-1 to 2-3.

The master 1-1 also employs the function of the shutdown control part 52 to perform the shutdown processing for the master 1-1, and also to permit the slaves 1-2 and 1-3 to perform the shutdown processing. That is, the shutdown control part 52 of the master 1-1 performs not only the shutdown processing for the master 1-1, but also performs the shutdown processing for the slaves 1-2 and 1-3. More specifically, although not shown in FIG. 3, when the shutdown control part 52 of the master 1-1 performs the shutdown processing for the master 1-1, the shutdown control part 52 generates an instruction (hereinafter referred to as a shutdown instruction) to perform the shutdown processing, and permits the communication part 30 to transmit the shutdown instruction to the slaves 1-2 and 1-3.

The shutdown instruction, which is transmitted by the communication part 30 under the control of the shutdown control part 52 of the master 1-1, is received by the communication parts 30 of the slaves 1-2 and 1-3 through the network 81. Then, although not shown in FIG. 3, this shutdown instruction is transmitted to the shutdown control parts 52 of the slaves 1-2 and 1-3. The shutdown control parts 52 of the slaves 1-2 and 1-3 respectively perform the shutdown processing for the slaves 1-2 and 1-3.

Figure 7:
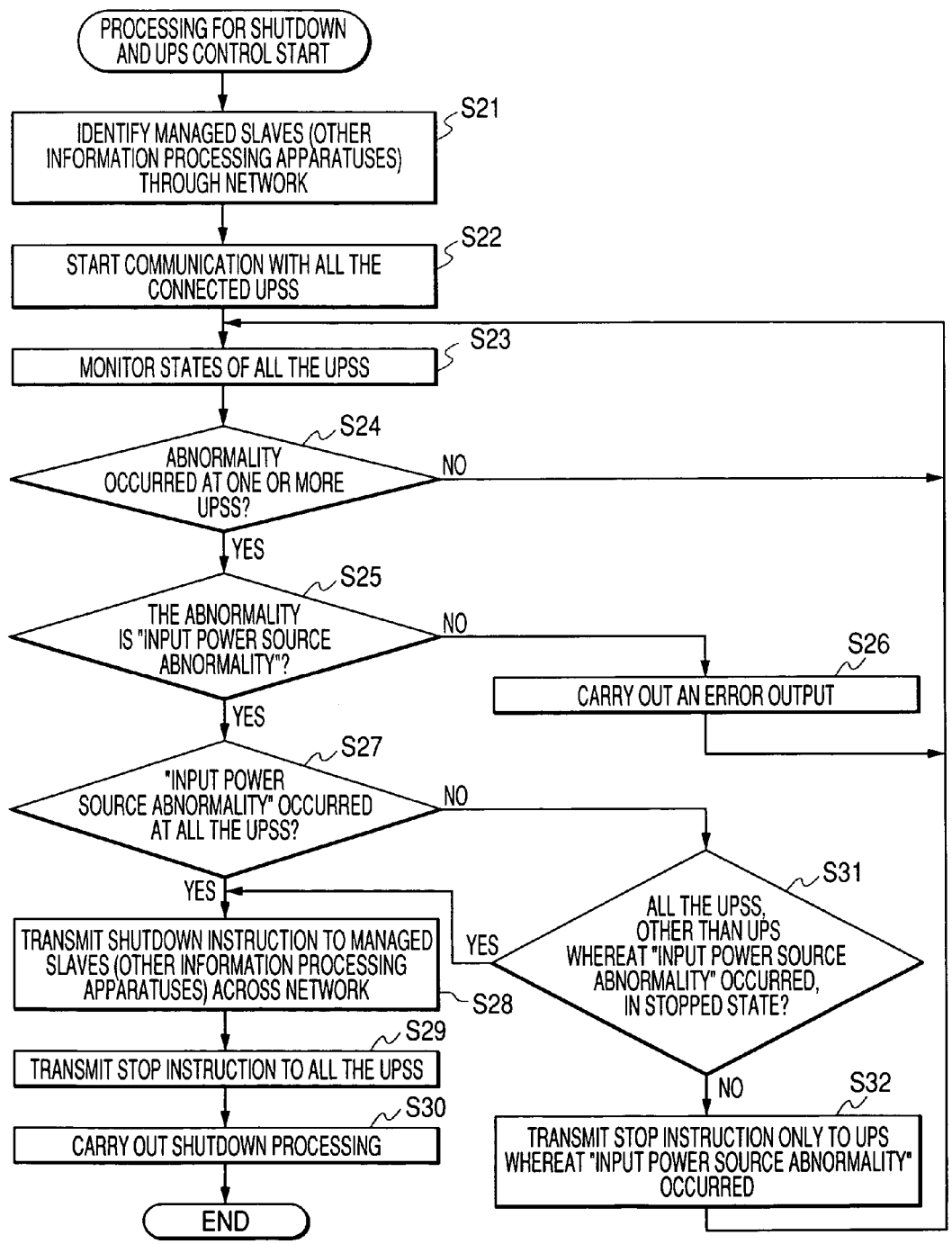
FIG. 7 is a flowchart for explaining the shutdown processing and UPS control processing performed by the information processing apparatus, included in the information processing system in FIG. 6, that has the 1+k redundant power supply function.

FIG. 7 is a flowchart for explaining example shutdown processing and UPS control processing performed by the master 1-1 having the 1+k redundant power supply function.

While referring to the flowchart in FIG. 7, the shutdown processing and UPS control processing performed by the master 1-1 is basically the same as that for the processing in FIG. 5; however, there is a slight difference.

Therefore, for the shutdown processing and UPS control processing in FIG. 7 performed by the master 1-1 having the 1+k redundant power supply function, no explanation will be given for the processes that are the same as those explained while referring to the flowchart in FIG. 5, and mainly, only processes that differ from those in FIG. 5 will be described.

The shutdown processing and UPS control processing (FIG. 7) is performed by the master 1-1 when the following first to third conditions are established.

The first condition, as well as that for FIG. 5, is the shifting of the states of all the UPSs 2-1 to 2-3 to the operating states.

The second condition, as well as that for FIG. 5, is the changing the power switches (not shown) of the master 1-1 and the slaves 1-2 and 1-3 to the ON states, i.e., the start of the supply of power by the electric power supply parts 31 (FIG. 2) of the master 1-1 and the slaves 1-2 and 1-3.

The third condition, as well as that for FIG. 5, is the activation of the OSs of the master 1-1 and the slaves 1-2 and 1-3 and the activation of application software that corresponds to the UPS monitoring parts 51, the shutdown control parts 52 and the UPS control parts 53 (shown in FIG. 3) of the master 1-1 and the slaves 1-2 and 1-3, i.e., the shifting of the states of the UPS monitoring part 51, the shutdown control part 52 and the UPS control part 53 of the master 1-1 to the states wherein corresponding functions can be performed, and the shifting of the states of the shutdown control parts 52 of the slaves 1-2 and 1-3 to the states wherein corresponding functions can be performed.

When the master 1-1 begins the shutdown processing and UPS control processing (FIG. 7), at step S21, the master 1-1 identifies, through the network 81, the slaves (other information processing apparatuses) 1-2 and 1-3 that are managed by the master 1-1.

Since the succeeding processing (the processing performed following step S22) is basically the same as that in FIG. 5, and no further explanation for it will be given.

However, since the shutdown processing and UPS control processing in FIG. 5 is provided when a single information processing apparatus 1 is operated, at step S7, the information processing apparatus 1 transmits the stop instruction to all the UPSs 2 (the UPSs 2-1 and 2-2 in the example in FIG. 1) before the process at step S8, i.e., the shutdown processing, is performed.

On the other hand, the shutdown processing and UPS control processing in FIG. 7 is provided when the information processing apparatus 1-1 is connected to the other information processing apparatuses 1-2 and 1-3 through the network 81, and is operated as a master for managing these apparatuses 1-2 and 1-3 as slaves. Therefore, before performing the process at step S30, i.e., the shutdown processing for the master 1-1, at step S28 the master 1-1 transmits a shutdown instruction through the network 81 to the slaves (other information processing apparatuses) 1-2 and 1-3 that are managed.

Upon receiving the shutdown instruction, the slaves (other information processing apparatuses) 1-2 and 1-3 perform the shutdown processing.

Further, before performing the process at step S30, i.e., the shutdown processing for the master 1-1, at step S29 the master 1-1 transmits the stop instruction to all the UPSs 2 (the UPSs 2-1 to 2-3 in the example in FIG. 6). In this case, among the shutdown processing periods required by the master 1-1 and the slaves 1-2 and 1-3, the longest period (or, a grace period may be added to this period as needed) can be employed as the designated period (a period that continues until the execution of the UPS stop process) included in the stop instruction.

At step S30, the shutdown processing for the master 1-1 is performed, and when this shutdown processing is completed, the shutdown processing and UPS control processing in FIG. 7 is terminated.

When the designated period included in the stop instruction has elapsed following the reception of this instruction, i.e., when the shutdown processing is completed for the master 1-1 and the slaves 1-2 and 1-3, all the UPSs (the UPSs 2-1 to 2-3 in the example in FIG. 6) perform the UPS stop process.

FIG. 8 is a diagram showing the relationship between the states of the input power sources for the individual UPSs 2 and the presence/absence of the shutdown processing and the UPS stop processing (the stop instruction to execute this process) when the master 1-1 in FIG. 6 performs the shutdown processing and UPS control processing in FIG. 7.

As is described above, since the master 1-1 and the slaves 1-2 and 1-3 have the 1+2 redundant power supply function, so long as at least one of the UPSs 2-1 to 2-3 is in the normal state, the master 1-1 and the slaves 1-2 and 1-3 can be operated normally, i.e., can continue the current processes.

Therefore, as is shown in the three rows from the top in FIG. 8 (entry blocks wherein ○ and X are entered), when the input electric source for at least one of the UPSs 2-1 to 2-3 is normal, i.e., when X is entered in at least one of the "input power source abnormality" entry blocks for the UPSs 2, the master 1-1 and the slaves 1-2 and 1-3 do not perform the shutdown processing (X is entered in the shutdown entry block).

However, when the shutdown processing is not performed, the master 1-1 and the slaves 1-2 and 1-3 continue their current processes, and, for the UPSs 2-1 to 2-3 for which the "input power source abnormality" has occurred (the UPSs 2 for which ○ is entered in the "input power source abnormality" entry blocks), the incorporated batteries 75 are employed to supply backup electric power. Therefore, for the UPSs 2 for which the "input power source abnormality" has occurred (UPSs 2 for which ○ is entered in the "input power source abnormality" entry blocks), the unnecessary discharge of the incorporated batteries 75 is performed, so that deterioration of the batteries 75 (reduction in the service lives) occurs.

In order to resolve this problem, as is shown in the three rows from the top in FIG. 8, the master 1-1 outputs the stop instruction to the UPS 2 for which the "input power source abnormality" has occurred, i.e, the UPS 2 for which ○ is entered in the "input power source abnormality" entry block (in this case, ○ is entered in the UPS 2 stop instruction entry block). That is, when the UPS 2 for which the "input power source abnormality" has occurred, i.e., the UPS 2 for which ○ is entered in the "input power source abnormality" entry block, receives the stop instruction from the master 1-1, the UPS 2 performs the stop processing to shift to the stopped state.

When the "input power source abnormality" has occurred at all the UPSs 2-1 to 2-3, the UPSs 2-1 and 2-3 employ their incorporated batteries 75 to supply backup electric power, so that the master 1-1 and the slaves 1-2 and 1-3 must perform the shutdown processing.

Therefore, as is shown in the fourth row from the top in FIG. 8, when the "input power source abnormality" has occurred at all the UPSs 2-1 to 2-3, i.e., when ◯ is entered in all the "input power source abnormality" entry blocks for the UPSs 2, the master 1-1 and the slaves 1-2 and 1-3 perform the shutdown processing (in this case, ◯ is entered in the shutdown entry blocks).

Further, when the UPSs 2-1 to 2-3 are left as they are, the unnecessary discharge of the incorporated batteries 75 is performed, and the batteries 75 are deteriorated (their service lives are reduced).

In order to resolve this problem, as is shown in the fourth row from the top in FIG. 8, the master 1-1 outputs the stop instruction to all the UPSs 2-1 to 2-3 for which the "input power source abnormality" has occurred, i.e., the UPSs 2 for which ◯ is entered in the "input power source abnormality" entry blocks for the UPSs 2 (in this case, ◯ is entered in the stop instruction entry blocks). Upon receiving the stop instruction, all the UPSs 2-1 to 2-3 perform the UPS stop processing to shift to the stopped states.

An explanation has been given for the shutdown processing and UPS control processing performed by the master 1-1 having the 1+2 redundant power supply function as is shown in FIG. 6. As is described above, the flowchart in FIG. 7, as well as the flowchart in FIG. 5, represents the general shutdown processing and UPS control processing performed by the master 1-1 having the 1+k redundant power supply function. In other words, when the master 1-1 has the 1+k redundant power supply function, the shutdown processing and UPS control processing is performed as is shown in the flowchart in FIG. 7.

In addition, when the master 1-1 has the n+k redundant power supply function, the shutdown processing and UPS control processing is basically the same as the above described processing.

However, when it is determined at step S25 that the abnormality is a "input power source abnormality", the following process is performed instead of steps S27 and S31. The shutdown control part 52 of the master 1-1 determines whether an abnormality has occurred at the input power source for at least one of the UPSs 2-1 to 2-($n+k$), and whether the number of the UPSs for which the input power sources are normally operated is smaller than n.

When it is determined that the abnormality has occurred at the input power source for at least one of the UPSs 2-1 to 2-($n+k$), and that the number of the UPSs 2 for which the input power sources are normally operated is smaller than n, the process beginning at step S28 is performed. In the other cases, the process beginning at step S32 is performed.

Furthermore, as is described above, when the master 1-1 and the slaves 1-2 and 1-3 perform the shutdown processing, none of the UPSs 2-1 to 2-($n+k$) need to supply electric power to the master 1-1 and the slaves 1-2 and 1-3, so that the process at step S29 in FIG. 7 may be left unchanged. However, in order to avoid the deterioration of the battery 75 of the UPS 2 for which the abnormality occurred at the input power source, the process at step S29 may be replaced with a process, as well as that at step S32, for transmitting a stop instruction only to the UPS 2 for which the "input power source abnormality" occurred.

The shutdown processing and UPS control processing has been explained while referring to the flowchart in FIG. 5 when the information processing apparatus 1 in FIG. 2 (FIG. 1) has the 1+k redundant power supply function. While referring to a flowchart in FIG. 9, a detailed explanation will now be given for the shutdown processing and UPS control processing when the information processing apparatus 1 has the n+k redundant power supply function.

The shutdown processing and UPS control processing (FIG. 9) performed by the information processing apparatus 1 having the n+k redundant power supply function is basically the same as that shown in the flowchart in FIG. 5; however, there is a slight difference.

Therefore, for the shutdown processing and UPS control processing in the flowchart in FIG. 9 performed by the information processing apparatus 1 having the n+k redundant power supply function, no explanation will be given for the processes that are the same as those in FIG. 5, and mainly, only different processes will be described.

Figure 9:
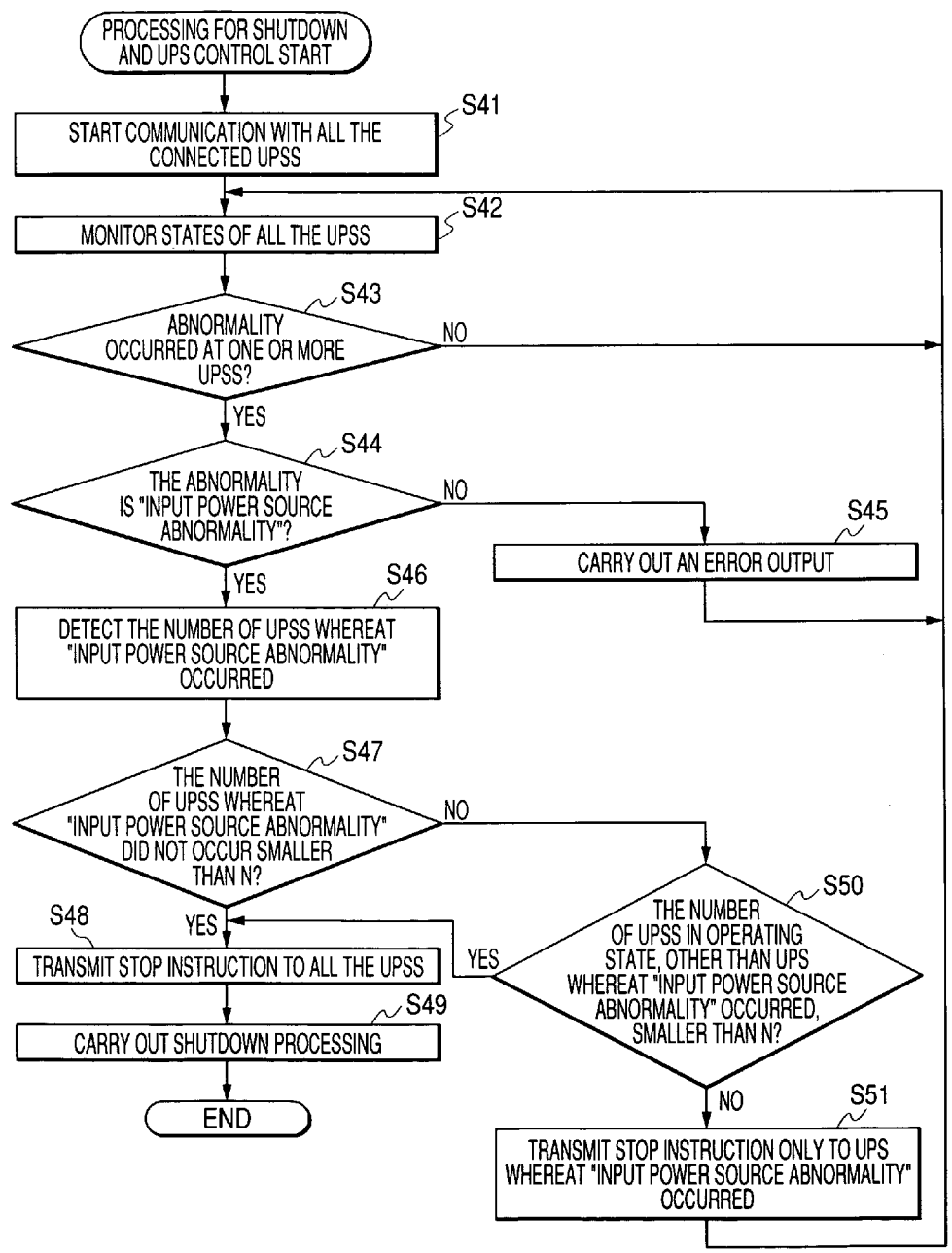
FIG. 9 is a flowchart for explaining the shutdown processing and UPS control processing performed by the information processing apparatus, included in the information processing system in FIG. 1, that has an n+k reductant power supply function.

The shutdown processing and UPS control processing in FIG. 9 is initiated by the information processing apparatus 1 having the n+k redundant power supply function when the first to third conditions in FIG. 5 are established.

Since the processes at steps S41 to S45 are basically the same as those at steps S1 to S5 in FIG. 5, no further explanation for them will be given.

At step S46, the UPS monitoring part 51 employs the monitoring results obtained at step S42 to detect the number of the UPSs 2 for which the "input power source abnormality" has occurred. Program control then advances to step S47.

At step S47, the UPS monitoring part 51 determines whether a difference between n+k, which is the number of the UPSs 2 connected to the information processing apparatus 1, and the number of the UPSs 2 obtained at step S46, i.e., the number of the UPSs 2 for which the "input power source abnormality" did not occur is smaller than n. When it is determined that the number of the UPSs 2 for which the "input power source abnormality" did not occur is smaller than n, program control advances to step S48.

When it is determined at step S47 that the number of the UPSs 2 for which the "input power source abnormality" did not occur is equal to or greater than, at step S50, the UPS monitoring part 51 determines whether the number of the UPSs 2 in the operating state, except for the UPSs 2 for which the "input power source abnormality" occurred, is smaller than n.

When it is determined at step S50 that the number of the UPSs 2 in the operating state, except for the UPSs 2 for which the "input power source abnormality" occurred, is smaller than n, i.e., when the number of the UPSs 2 for which the input power sources are operating normally is smaller than n, it is assumed that the shutdown processing is required to resolve the problem described at step S9 in FIG. 5. Program control is then shifted to step S48.

When it is determined at step S50 that the number of the UPSs 2 in the operating state, except for the UPSs 2 for which the "input power source abnormality" has occurred, is equal to or greater than n, program control advances to step S51.

Since the processes at steps S48, S49 and S51 are basically the same as those at steps S7, S8 and S10 in FIG. 5, no further explanation for them will be given.

As is described above, when the information processing apparatus 1 has the n+k redundant power supply function, at step S46 the UPS monitoring part 51 detects the number of the UPSs 2 for which the "input power source abnormality" occurred, and the shutdown control part 52 performs the shutdown processing when the number of the UPSs 2 for which the "input power source abnormality" did not occur is smaller than n, which is the number of UPSs 2 required for a normal operation, or when the number of the UPSs that are operating normally is smaller than n. Therefore, it is possible to prevent the occurrence of phenomena where the electric power required for a normal operation can not be supplied to the information processing apparatus 1 and information currently being processed is destroyed or lost, and where the information processing apparatus 1 (e.g., the incorporated hard disk) is damaged.

FIG. 10 is a diagram showing the relationship between the states of the input power sources for the UPSs 2 and the presence/absence of the shutdown processing and the UPS stop processing when the shutdown processing and UPS control processing in FIG. 9 is performed by the information processing apparatus 1 in FIG. 2.

In FIG. 10, the information processing apparatus 1 has a 2+1 redundant power supply function. In this case, so long as at least two of the UPSs 2-1 to 2-3 are in the normal state, the information processing apparatus 1 can be operated normally.

Therefore, as is shown in the four rows from the top in FIG. 10 (where ○ and X are entered), when the input power sources for at least two of the UPSs 2-1 to 2-3 are operated normally, i.e., X is entered in at least two of the "input power source abnormality" entry blocks for the UPSs 2, the information processing apparatus 1 does not perform the shutdown processing (in this case, X is entered in the shutdown entry block).

However, for the UPS 2 for which the "input power source abnormality" occurred i.e., for which ○ is entered in the "input power source abnormality" entry block, the incorporated battery 75 unnecessarily discharges power, and deterioration of the battery 75 occurs. Therefore, in order to resolve this problem, as shown in the four rows from the top in FIG. 10 as well as in FIG. 8, the information processing apparatus 1 outputs the stop instruction to the UPS 2 for which the "input power source abnormality" has occurred. Upon receiving this stop instruction, the UPS 2 for which the "input power source abnormality" occurred performs the UPS stop processing to shift to the stopped state.

On the other hand, when the "input power source abnormality" occurred at two or more UPSs 2-1 to 2-3, these UPSs 2 employ the incorporated batteries 75 to supply backup electric power. Thus, the information processing apparatus 1 must perform the shutdown processing.

Therefore, as is shown in the fifth to the eighth rows in FIG. 10, when the "input power source abnormality" occurred at two or more UPSs 2-1 to 2-3, i.e., when ○ is entered in two or more "input power source abnormality" entry blocks for the UPSs 2, the information processing apparatus 1 performs the shutdown processing (in this case, ○ is entered in the shutdown entry block).

Furthermore, in this case as well as in FIG. 8, when the UPSs 2-1 to 2-3 are left as they are, the incorporated batteries are discharged unnecessarily, and the batteries 75 are deteriorated. To resolve this problem, as is shown in the fifth to the eighth rows in FIG. 10, the information processing apparatus 1 outputs the stop instruction to all the UPSs 2-1 to 2-3 (○ is entered in the stop instruction entry blocks) Instead of being transmitted to all the UPSs 2-1 to 2-3, the stop instruction may be transmitted to only the UPSs 2 for which the "input power source abnormality" occurred, i.e., for which ○ is entered in the "input power source abnormality" entry blocks. Upon receiving the stop instruction, the UPSs 2 perform the UPS stop processing to shift to the stopped state.

While referring to the flowchart in FIG. 7, an explanation has been given for the shutdown processing and UPS control processing performed when the master 1-1 in FIG. 6 has the 1+k redundant power supply function. While referring to a flowchart in FIG. 11, a detailed explanation will now be given for the shutdown processing and UPS control processing performed by the master 1-1 having the n+k redundant power supply function.

Figure 11:
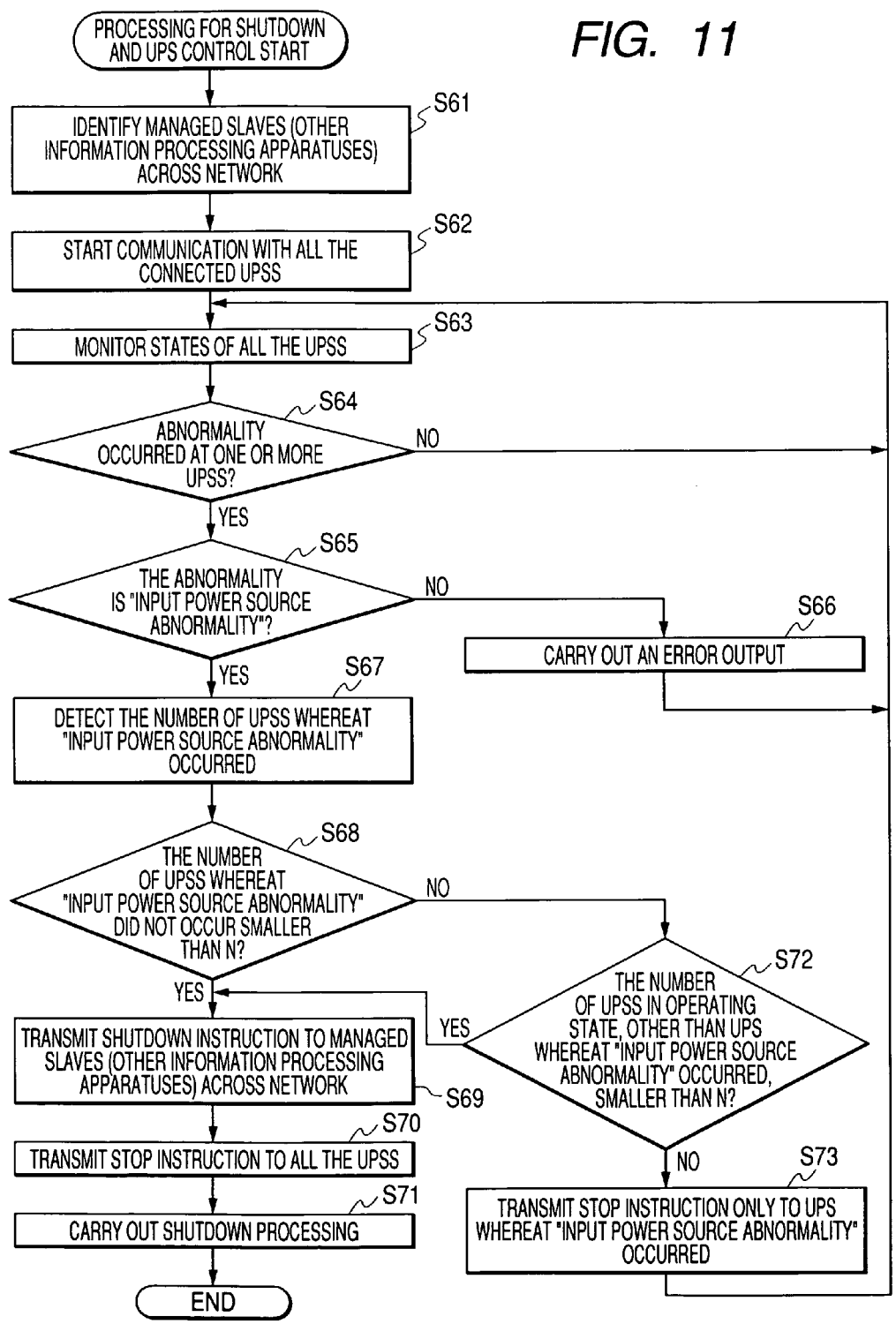
FIG. 11 is a flowchart for explaining the shutdown processing and UPS control processing performed by the information processing apparatus, included in the information processing system in FIG. 6, that has the n+k redundant power supply function.

The shutdown processing and UPS control processing in FIG. 11 performed by the master 1-1 having the n+k redundant power supply function is basically the same as those shown in the flowcharts in FIGS. 5 and 7; however, there is a slight difference.

Therefore, in the shutdown processing and UPS control processing in FIG. 11 performed by the master 1-1 having the n+k redundant power supply function, no explanation will be given for the processes that are the same as those in FIGS. 5 and 7, and mainly, only different processes will be described.

The shutdown processing and UPS control processing in FIG. 11 is initiated by the information processing apparatus 1 having the n+k reductant power supply function when the first to third conditions in FIG. 7 are established.

Since steps S61 to S66 are basically the same as steps S21 to S26 in FIG. 7, no further explanation for them will be given.

At step S67, the UPS monitoring part 51 of the master 1-1 employs the monitoring results obtained at step S63 to detect the number of UPSs 2 for which the "input power source abnormality" occurred. Program control then advances to step S68.

At step S68, the UPS monitoring part 51 determines whether a difference between n+k, which is the number of UPSs 2 connected to the master 1-1, and the number of UPSs 2 obtained at step S67, i.e., the number of UPSs 2 for which the "input power source abnormality" did not occur is smaller than n. When it is determined that the number of the UPSs 2 for which the "input power source abnormality" did not occur is smaller than n, program control advances to step S69.

When it is determined at step S68 that the number of the UPSs for which the "input power source abnormality" did not occur is equal to or greater than n, at step S72, the UPS monitoring part 51 determines whether the number of UPSs 2 in the operating state, except for the UPSs 2 for which the "input power source abnormality" occurred, is smaller than n.

When it is determined at step S72 that the number of UPSs 2 in the operating state, except for the UPSs for which the "input power source abnormality" occurred, is smaller than n, i.e., when the number of UPSs 2 for which the input power sources are in the normal state is smaller than n, it is assumed that the shutdown processing is required to resolve the problem described at step S9 in FIG. 5. Then, program control is shifted to step S69.

When it is determined at step S72 that the number of UPSs 2 in the operating state, except for the UPS 2 for which the "input power source abnormality" occurred, is equal to or greater than n, program control advances to step S73.

Since steps S69 to S71 and S73 are basically the same as steps S28 to S30 and S32 in FIG. 5, no further explanation for them will be given.

As is described above, when the master 1-1 has the n+k redundant power supply function, at step S67 the UPS monitoring part 51 of the master 1-1 detects the number of UPSs 2 for which the "input power source abnormality" occurred, and when the number of the UPSs for which the "input power source abnormality" occurred is smaller than n, which is the number of the UPSs 2 required for normal operation, the shutdown control parts 52 of the master 1-1 and the slaves 1-2 and 1-3 perform the shutdown processing. Therefore, it is possible to avoid the occurrence of phenomena where the electric power required for normal operation can not be supplied to the master 1-1 and the slaves 1-2 and 1-3 and information currently being processed is destroyed or lost, and where the master 1-1 and the slaves 1-2 and 1-3 (e.g., the incorporated hard disks) are damaged.

FIG. 12 is a diagram showing the relationship between the states of the input power sources for the UPSs 2 and the presence/absence of the shutdown processing and the UPS stop processing when the master 1-1 in FIG. 6 performs the shutdown processing and UPS control processing in FIG. 11.

In FIG. 12, the information processing apparatus 1 has the 2+2 redundant power supply function. In this case, when at least two of four UPSs 2-1 to 2-4 are in the normal state, the information processing apparatus 1 can be operated normally.

Therefore, as indicated in the eleven rows from the top in FIG. 12 (wherein ○ and X are entered), when the input power sources for at least two of the UPSs 2-1 to 2-4 are operating normally, i.e., X is entered in at least two of the "input power source abnormality" entry blocks for the UPSs 2, the master 1-1 and the slaves 1-2 and 1-3 do not perform the shutdown processing (in this case, X is entered to the shutdown entry blocks).

However, for the UPSs 2 for which the "input power source abnormality" occurred, i.e., for which ○ is entered in the "input power source abnormality" entry blocks, the unnecessary discharge of the incorporated batteries 75 is performed and deterioration of the batteries 75 occurs. In order to resolve this problem, as well as in FIGS. 8 and 10, as indicated in the eleven rows from the top in FIG. 12, the information processing apparatus 1 outputs the stop instruction to the UPSs 2 for which the "input power source abnormality" occurred (in this case, ○ is entered in the stop instruction entry blocks for the UPSs 2). Upon receiving this stop instruction, the UPSs 2 for which the "input power source abnormality" occurred perform the UPS stop processing to shift to the stopped state.

On the other hand, when the "input power source abnormality" occurred at three or more of the UPSs 2-1 to 2-4, the UPSs 2 for which the "input power source abnormality" occurred employ the incorporated batteries 75 to supply backup electric power, so that the information processing apparatus 1 must perform the shutdown processing. In other words, since at least two UPSs 2 are not operating normally, the shutdown processing is required.

Therefore, as indicated in the twelfth to sixteenth rows in FIG. 12, when the "input power source abnormality" occurred at three or more UPSs 2-1 to 2-4, i.e., when ○ is entered in three or more "input power source abnormality" entry blocks for the UPSs 2, the information processing apparatus 1 performs the shutdown processing (in this case, ○ is entered in to the shutdown entry blocks).

Furthermore, when the UPSs 2-1 to 2-4 are left as they are, the incorporated batteries 75 are unnecessarily discharged and cause the batteries 75 to be deteriorated. Therefore, as well as in FIGS. 8 and 10, in order to resolve this problem, as indicated in the twelfth to sixteenth rows in FIG. 12, the master 1-1 outputs the stop instruction to all the UPSs 2-1 to 2-4 (○ is entered in the stop instruction entry blocks). The master 1-1 may output the stop instruction only to the UPSs 2-1 to 2-4 for which the "input power source abnormality" occurred, i.e., for which ○ is entered in the "input power source abnormality" entry blocks. Upon receiving the stop instruction, the UPSs 2 perform the UPS stop processing to shift to the stopped state.

In the above explanation, the shutdown processing and UPS control processing is performed on the assumption that n, which is the minimum required number of UPSs 2 for the normal operation of the information processing apparatus 1, and n+k, which is the total number of UPSs 2 connected to the information processing apparatus 1, are designated in advance. An example method for designating the values n and n+k is a user input method whereby a user manipulates the input part 26 to enter the values n and n+k.

Figure 13:
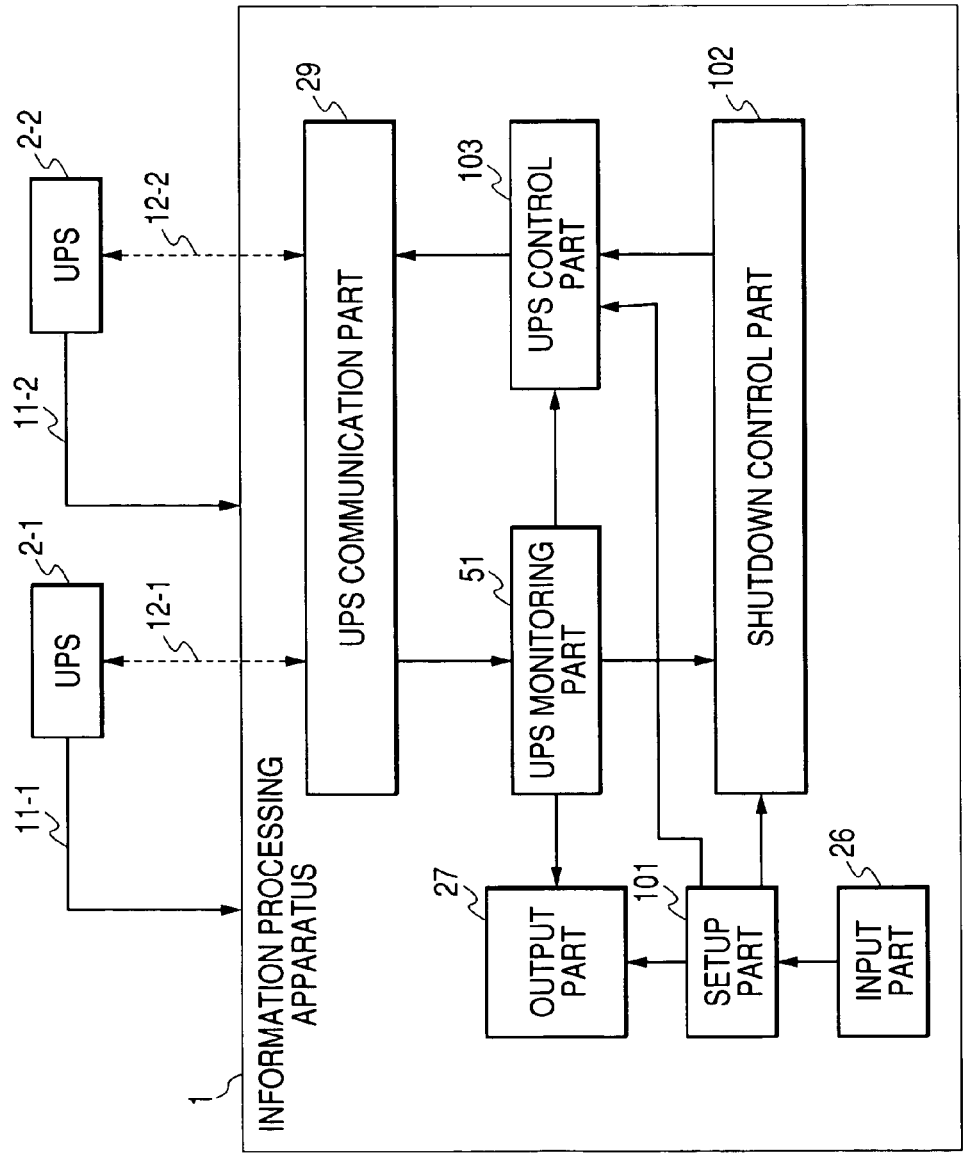
FIG. 13 is a block diagram for explaining the functions of the information processing apparatus in FIG. 2 that employ the present invention while a user input method is used to set values n and n+k.

FIG. 13 is a block diagram showing the functions of the information processing apparatus 1 performed when the user input method is employed to designate the values n and n+k; i.e., a function whereby the shutdown processing and the UPS stop processing are performed, and a function whereby the setup of the values n and n+k and the other setups concerning the UPSs 2 connected to the information processing apparatus 1 are performed.

As is shown in FIG. 13, these functions can be provided, for example, by the hardware shown in FIG. 2, such as the input part 26, the output part 27 and the UPS communication part 29, and by software executed by the CPU 21 in FIG. 2, such as the UPS monitoring part 51, a setup unit 101, a shutdown control part 102 and a UPS control part 103. In FIG. 13, the same reference numerals are employed to denote components corresponding to those in FIG. 3, and no further explanation for them will be given.

Since the information processing apparatus 1 for this invention is a computer shown in FIG. 2, the UPS monitoring part 51, the setup unit 101, the shutdown control part 102 and the UPS control part 103 are provided by software. However, all or part of these components may be provided as hardware, or by using both hardware and software. In this case, a hardware block is additionally provided for the configuration of the information processing apparatus 1 in FIG. 2.

The input part 26 is manipulated by the user, and transmits, to the setup unit 101, an input signal corresponding to the user's manipulation. When the output part 27 is provided as a display device, a setup screen is displayed on the output part 27 to perform the setup of the UPSs 2 connected to the information processing apparatus 1. The user manipulates the input part 26 to enter the setup for the UPSs 2 on the setup screen displayed on the output part 27.

Based on the input signal transmitted by the input part 26, the setup unit 101 performs the setup for the UPSs 2, i.e., sets parameters in accordance with the entries concerning the UPSs 2. These entries are individual entries wherein parameters are designated for the individual UPSs 2 and common entries wherein a parameter used in common is designated for all the UPSs 2. For example, the value n+k is entered as a parameter for a common entry. The individual entries and the common entries will be described in detail later while referring to FIGS. 14 to 27.

Based on the parameters designated in the common entries or the individual entries, the setup unit 101 generates shutdown control information for controlling the shutdown control part 102, or UPS control information for controlling the UPS control part 103, and transmits the shutdown control information to the shutdown control part 102, or the UPS control information to the UPS control part 103.

The UPS control information generated based on the parameters in the common entries is called common UPS control information, while the UPS control information generated based on the parameters in the individual entries is called individual UPS control information. Since the shutdown control information is generated based on the parameters in the common entries, the shutdown control information is control information used in common for all the UPSs 2 connected to the information processing apparatus 1.

When the output part 27 is a display device, the setup unit 101 transmits to the output part 27 an image signal for the setup screen used for the setup of the common entries or the individual entries, and displays the setup screen on the output part 27.

The shutdown control part 102 performs the shutdown processing and UPS control processing as explained while referring to FIG. 5, 7, 9 or 11 in accordance with the shutdown control information received from the setup unit 101 and the monitoring results obtained by the UPS monitoring part 51. For example, when the shutdown control information represents the value n+k, the shutdown control part 102 extracts the value n+k from the shutdown control information, and performs the shutdown processing and UPS control processing in accordance with the value n+k and the monitoring results obtained by the UPS monitoring part 51.

Based on the common UPS control information received from the setup unit 101, the UPS control part 103 generates control information for controlling the states of all the UPSs 2 connected to the information processing apparatus 1, and permits the UPS communication part 29 to transmit the control information to all the UPSs 2 that are connected to the information processing apparatus 1 and that are to be controlled. Furthermore, based on the individual UPS control information received from the setup unit 101, the UPS control part 103 generates control information for controlling the states of the UPSs 2 that are to be controlled, i.e., the UPSs 2 for which the parameters are designated in the individual entries, and permits the UPS communication part 29 to transmit the control information to the UPSs 2 that are to be controlled.

Further, as well as the UPS control part 53, the UPS control part 103 receives from the shutdown control part 102 information indicating the scheduled remaining processing period for the shutdown control part 102. The UPS control part 103 adds, to the stop instruction, contents indicating that the UPS stop processing should be executed after the scheduled remaining period has elapsed following the reception of the stop instruction. Thereafter, the UPS control part 103 permits the UPS communication part 29 to transmit the resultant stop instruction to the UPSs 2 that transmitted the "input power source abnormality" information.

Through this processing, in the information processing apparatus 1 shown in FIG. 13, the shutdown control part 102 and the UPS control part 103 are controlled based on the parameters designated by the setup unit 101, including the value n+k.

Figure 16:
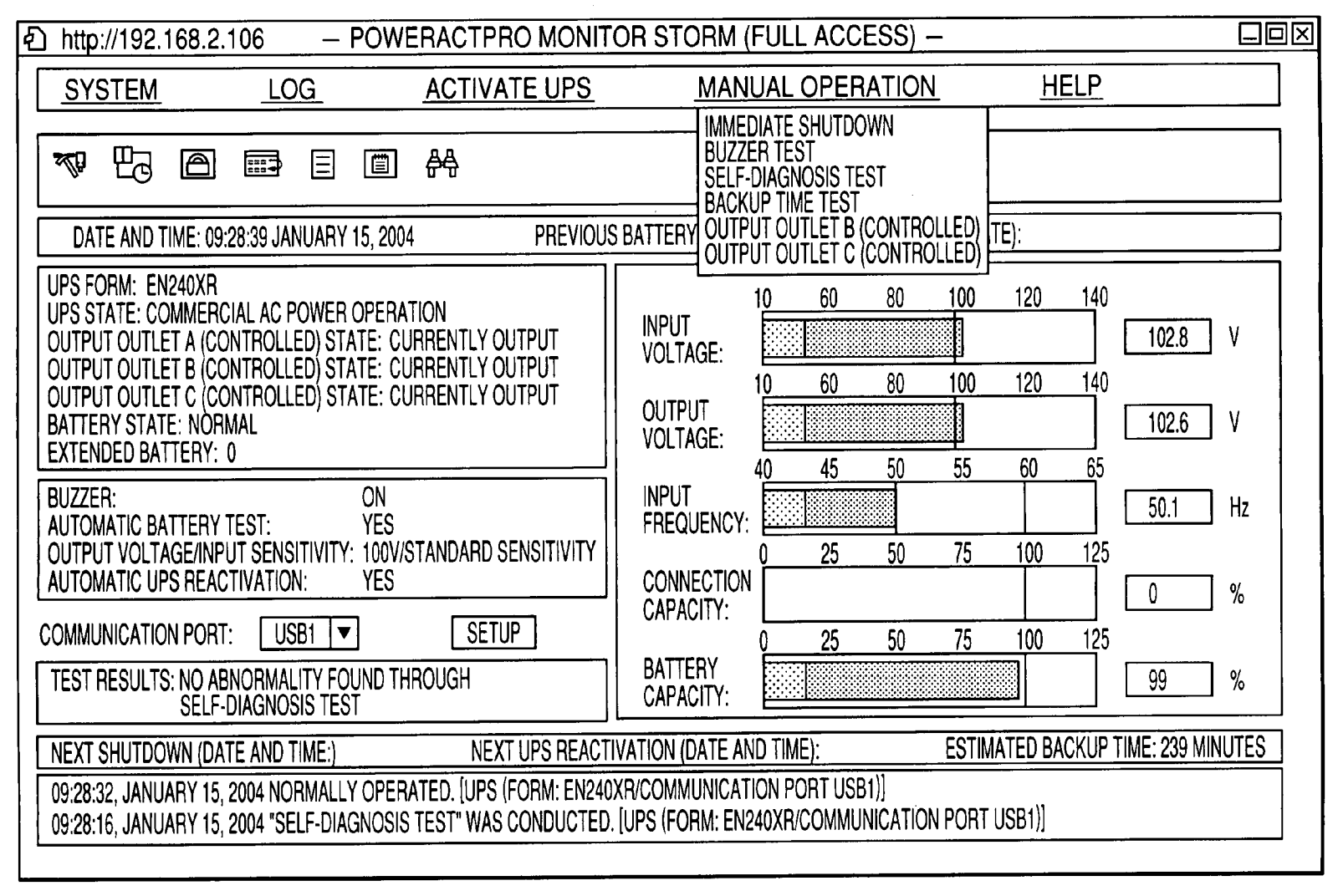

FIGS. 14 to 16 are diagrams showing an example setup screen for setting the parameters in the individual entries displayed on the output part 27, which is a display device.

The user, for example, manipulates the input part 26 and selects one of the UPSs 2 connected to the information processing apparatus 1 in order to perform the setup for the individual entries. Then, as is shown in FIG. 14, the setup screen for the individual entries is displayed on the output part 27. That is, the setup screens shown in FIGS. 14 to 16 are displayed for each UPS 2.

The setup screens in FIGS. 14 and 16 include a "UPS setup" entry for performing various setups for the UPS 2 corresponding to the current setup screen, and a "manual operation" entry for performing a manual operation.

The "UPS setup" entry is an individual entry, and as is shown in FIG. 14, is further divided into small individual entries, such as "buzzer", "automatic battery test", "output voltage/input sensitivity" and "battery usage start date (exchange date)". For example, for the "buzzer" entry, the ON or OFF state of a buzzer that can be the output part 27 can be set to generate a warning sound. For the "automatic battery test" entry, the validation or invalidation of the tests of the battery 75 for the UPS 2 can be entered. For the "output voltage/input sensitivity" entry, the output voltage and the input sensitivity can be changed. For the "battery usage start date (exchange date)" entry, the start date (exchange date) for the usage of the battery 75 can be entered as is shown in FIG. 15. In FIG. 15, "Jan. 5, 2004" is entered as the start date (exchange date) for the usage of the previous battery 75, and "Jan. 15, 2004" is entered as the start date (exchange date) of the usage of the current battery 75.

Furthermore, as is shown in FIG. 16, the "manual operation" drop-down menu contains a list of items such as "immediate shutdown", "buzzer test", "self-diagnosis test", "backup time test (run time test)", "output outlet B (controlled)" and "output outlet C (controlled)". The "immediate shutdown" entry, which is a common entry, can be designated on the setup screen for the individual entries shown in FIG. 16 and the parameter entered is used in common for all the UPSs 2. The "immediate shutdown" entry will be described in detail later.

The "buzzer test", the "self-diagnosis test", the "backup time test", the "output outlet B (controlled)" and the "output outlet C (controlled)" are individual entries. For example, for the "buzzer test", the validation or invalidation of the test of a buzzer, which can be the output part 27, can be designated. For the "self-diagnosis test", the validation or invalidation of a self-diagnosis test for briefly detecting the failure of the UPS 2 or the deterioration of the battery 75 can be designated. For the "backup time test", the validation (execute) or invalidation (cancel) of a backup time test can be designated to change the backup time. For the "output outlet B" or the "output outlet C", the starting or stopping of the output from the output outlet B or C, and the start time can be designated.

In this case, the output outlet represents a group of all the UPSs 2 for each information processing apparatus 1 to be connected. In FIG. 6, the master 1-1 and the slaves 1-2 and 1-3 are connected individually to the UPSs 2-1 to 2-3. However, when the master 1-1, for example, is connected to the UPS 2-1, the slave 1-2 is connected to the UPS 2-2 and the slave 1-3 is connected to the UPS 2-3, the UPS 2-1 is an output outlet A, the UPS 2-2 is an output outlet B, and the UPS 2-3 is an output outlet C.

FIGS. 17 to 27 are diagrams showing example setup screens used to designate parameters for the common entries displayed on the output part 27, which is a display device.

The common entries are, for example, "environment setup", "schedule", "access right setup", "end application information", "immediate shutdown", "agent search", "logout" and "online help and version information".

The setup screen for designating a parameter for common entry "environment setup" will now be described while referring to FIGS. 17 to 23.

As is shown in FIGS. 17 to 23, common entry "environment setup" is further divided into small common entry blocks such as "shutdown parameter", "UPS ACTIVATION/RE-ACTIVATION", "log option" and "communication setup".

Further, as is shown in FIG. 17, common entry "shutdown parameter" is further divided into small common entries, such as "agent selection", "redundant power supply system", "other devices" and "output outlet information".

In FIG. 17, an example setup screen is shown for designating a parameter for common entry "agent selection".

As is shown in FIG. 17, common entry "agent selection" is further divided into small common entries, such as "UPS output outlet selection", "STANDBY TIME", "shutdown start delay", "TIME NECESSARY FOR SHUTDOWN", "external command line", "external command execution time" and "OS end mode". For common entry "UPS output outlet selection", a desired output outlet can be selected. And in FIG. 17, "output outlet A (no control)" is selected for the "UPS output outlet selection". Therefore, parameters in common entries "STANDBY TIME", "shutdown start delay", "TIMENECESSARYFORSHUTDOWN", "externalcommandline", "external command execution time" and "OS end mode", all of which will be described later, are designated for all the UPSs that are "output outlet as" connected to the information processing apparatus 1.

For common entry "STANDBY TIME", a period extending from the occurrence of an input power source abnormality to the start of the shutdown processing can be entered. For example, when it is determined at step S6 in FIG. 5 that a "input power source abnormality" has occurred at all the UPSs 2, or when it is determined at step S9 in FIG. 5 that the UPSs 2 other than the UPS 2 for which the "input power source abnormality" occurred are in the stopped state, the shutdown control part 102 does not start the shutdown processing at step S8 until the period (60 seconds in FIG. 17) designated in common entry "STANDBY TIME" has elapsed.

For the "shutdown start delay", the period since the time designated in "STANDBY TIME" has elapsed until the shutdown processing is started can be designated. For example, when it is determined at step S6 in FIG. 5 that a "input power source abnormality" occurred at all the UPSs 2, or when it is determined at step S9 in FIG. 5 that all the UPSs 2, except the UPS 2 for which the "input power source abnormality" occurred, are in the stopped state, the shutdown processing is not started at step S8 in FIG. 5 until the time designated in common entry "shutdown start delay" is reached after the period (60 seconds in FIG. 17) designated in common entry "STANDBY TIME" has elapsed. In FIG. 17, "0 seconds" is designated for common entry "shutdown start delay". Therefore, when the decision at step S6 or S9 in FIG. 5 is obtained and when 60 seconds, which are designated in common entry "STANDBY TIME", have elapsed, the shutdown control part 102 performs the shutdown processing at step S8.

For common entry "TIME NECESSARY FOR SHUTDOWN", the designated period described above (180 seconds in FIG. 17) can be entered. At step S7 or S10 in FIG. 5, the stop instruction is transmitted to all the UPSs 2 with information indicating that the UPS stop processing should be executed after the designated period of 180 seconds elapses. When 180 seconds have elapsed since the receipt of this stop instruction, the UPSs 2 perform the UPS stop processing For common entry "external command line", a command to be executed during the shutdown processing can be entered. In FIG. 17, no command is designated in common entry "external command line". For common entry "external command execution time", a period required for the execution of an external command designated in common entry "external command line" can be designated (in FIG. 17, this period is "0 seconds" because no command is entered in "external command line"). After the "external command execution time" has elapsed following the execution of the external command, the next process is performed.

For common entry "OS end mode", the end mode for the OS ("stopped state" in FIG. 17) can be entered.

FIG. 18 is a diagram showing an example setup screen for designating common entry "redundant power supply system".

As is shown in FIG. 18, a user can select either a check box representing "validate a 1+1 or 1+k redundant power supply function" or a check box representing "validate an n+1 or n+k redundant power supply function". For example, when the user manipulates the input part 26 to select the check box representing "validate a 1+1 or 1+k redundant power supply function", the information processing apparatus 1 performs the shutdown processing and UPS control processing in FIG. 5 or 7 when the 1+k redundant power supply function is provided.

Specifically, when the user manipulates the input part 26 to select the check box representing "validate a 1+1 or 1+k redundant power supply function", the input part 26 transmits to the setup unit 101 the corresponding input signal indicating the entry of a parameter for the validation of the 1+1 or 1+k redundant power supply function. Upon receiving the signal from the input part 26, the setup unit 101 sets, to common entry "redundant power supply system", the parameter for the validation of the 1+1 or 1+k redundant power supply function. Further, based on the parameter for the validation of the 1+1 or 1+k redundant power supply function, the setup unit 101 transmits, to the shutdown control part 102, shutdown control information for controlling the shutdown control part 102, so that the shutdown control part 102 performs the shutdown processing and UPS control processing in FIG. 5 or 7 employed when the 1+k redundant power supply function is provided.

When the user selects the check box representing "validate an n+1 or n+k redundant power supply function", the information processing apparatus 1 performs the shutdown processing and UPS control processing in FIG. 9 or 11 employed when the n+1 or n+k redundant power supply function is provided.

In addition, when the user selects the check box representing "validate an n+1 or n+k redundant power supply function", in accordance with an instruction "enter the number of power units mounted on a information processing apparatus, the user enters, as a parameter, the number of power units 41 (FIG. 2) mounted on the information processing apparatus 1. Then, in accordance with an instruction "enter the number of power units required for the normal operation of a information processing apparatus", the user enters, as a parameter, the value n, which is the number of power units 41 (UPSs 2) required for the normal operation of the information processing apparatus Further, the user enters, as a parameter, a value n+k, which is the number of UPSs 2 that supply electric power to the power units 41, i.e., the number of UPSs 2 connected to the information processing apparatus. In this case, the user enters a parameter in the column of a table in FIG. 18 that asks "how many power units is a UPS supplying electric power to?".

In FIG. 18, "2" is entered as a parameter value n, and "3(=1+1+1)" is entered as a value n+k. As is described above, since the user enters the values for n+k and n, the information processing apparatus 1 can identify these values. Therefore, when the parameters shown in FIG. 18 are entered by the user, the information processing apparatus 1 can identify that it has the 2+1 redundant power supply function, and can perform the shutdown processing and UPS control processing in FIG. 9 or 11 employed when the n+k redundant power supply function is provided.

Figure 19:
FIG. 19 is a diagram showing an example setup screen for setting a parameter for common sub-entry "shutdown parameter" in common entry "environment setup"

FIG. 19 is a diagram showing an example setup screen for setting a parameter for common entry "other devices".

As is shown in FIG. 19, for common entry "other devices, a period until the information processing apparatus 1 is connected to an output outlet can be designated for each output outlet. In FIG. 19, for output outlets A, B and C, 0 seconds is set as the period until the information processing apparatus 1 connected to the output outlet is stopped.

Figure 20:
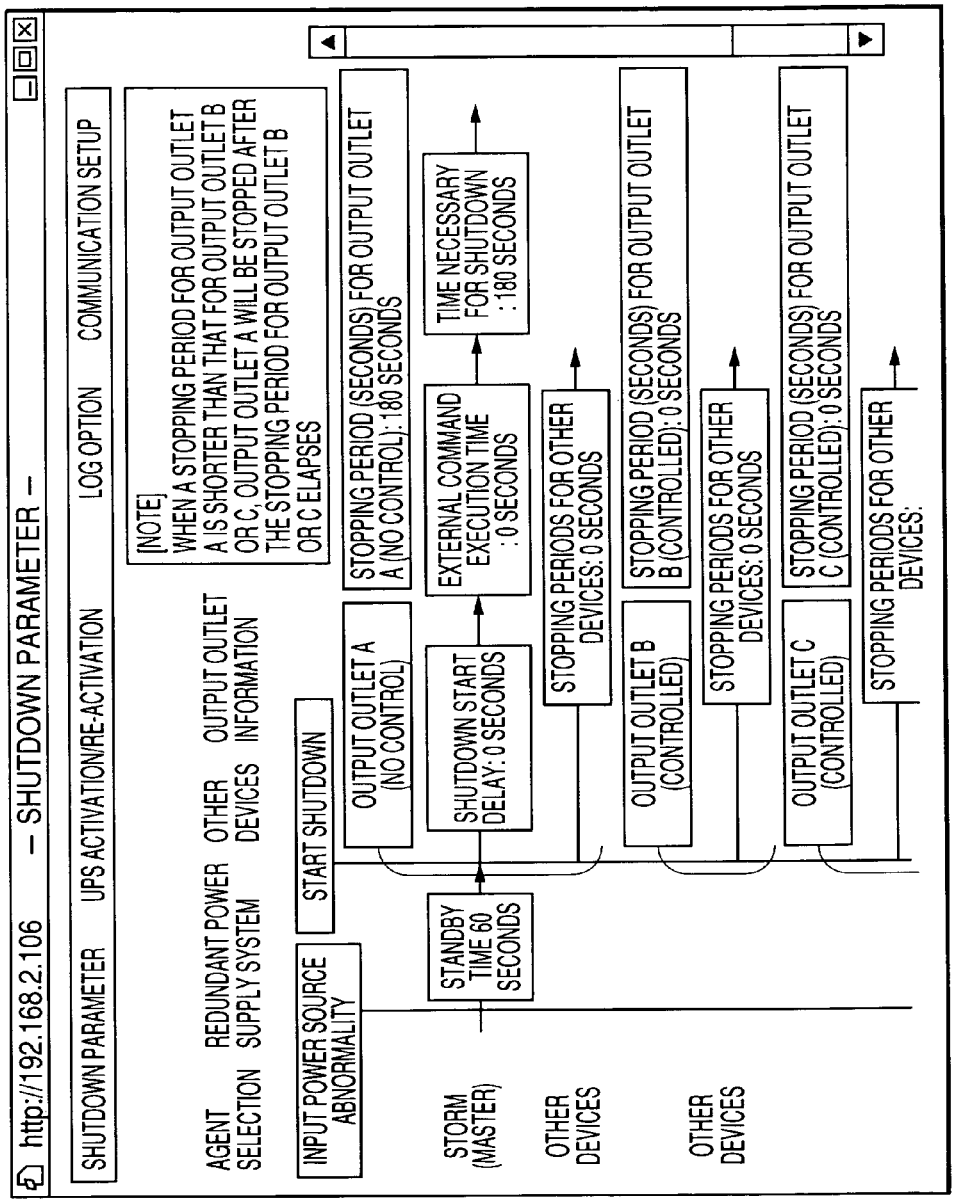
FIG. 20 is a diagram showing an example setup screen for setting a parameter for common sub-entry "shutdown parameter" in common entry "environment setup"

FIG. 20 is a diagram showing an example setup screen for setting a parameter for common entry "output outlet information".

As is shown in FIG. 20, for common entry "output outlet information", a list of setup contents provided for output outlets connected to the information processing apparatus 1 can be displayed.

FIG. 21 is a diagram showing an example setup screen for setting a parameter for the small common entry "UPS ACTIVATION/RE-ACTIVATION" in common entry "environment setup".

When the UPS 2 for which the "input power source abnormality" has occurred is stopped at step S7 or S10 in FIG. 5, and when thereafter the input power source for this UPS 2 becomes normal, whether the UPS 2 should be automatically reactivated can be designated for common entry "UPS ACTIVATION/RE-ACTIVATION". In FIG. 21, the automatic reactivation of the UPS 2 is designated. When, as is shown in FIG. 21, the automatic reactivation of the UPS 2 is designated, the period during which the activation of the UPS 2 is delayed can be designated for each output outlet. In FIG. 21, 0 seconds is designated as the delay periods for the output outlets A, B and C, so that the UPSs 2 connected to the output outlets A, B and C are reactivationed at the same time.

Figure 22:
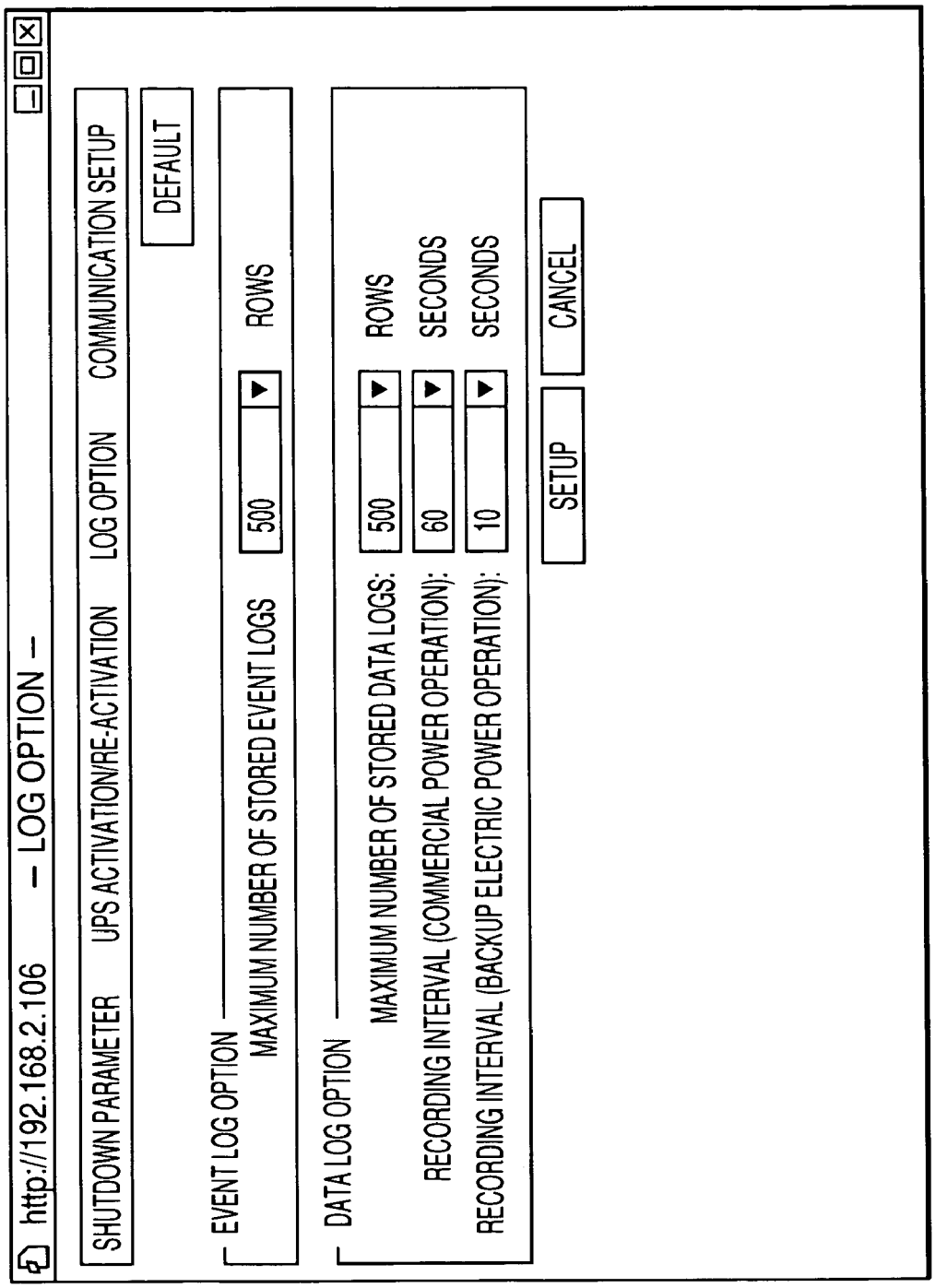
FIG. 22 is a diagram showing an example setup screen for setting a parameter for common sub-entry "log option" in common entry "environment setup"

FIG. 22 is a diagram showing an example setup screen for setting a parameter for common entry "log option".

As is shown in FIG. 22, for common entry "log option" entered, for example, are the number of rows (500 rows in FIG. 22) in which event logs representing events for the information processing apparatus are stored, the number of rows (500 rows in FIG. 22) in which a data log, such as data for the input and output voltages of the UPS 2, is stored, and the interval (60 seconds (commercial alternating current power employed) and 10 seconds (backup electric power employed) in FIG. 22) at which the data log is stored during the commercial alternating current power operation and during the backup electric power operation. The CSV (Comma Separated Value) form, for example, is employed to store the event log and the data log.

FIG. 23 is a diagram showing an example setup screen for setting a parameter for common entry "communication setup".

As is shown in. FIG. 23, the UPS 2 connected to the information processing apparatus can be displayed for common entry "communication setup". Further, for "communication setup", validation or invalidation of a manual or an automatic search for a communication port connected to the UPS 2 can be designated. In addition, for "communication setup", a network port, for accessing the WEB (World Wide Web), validation or invalidation, for inhibiting the WEB access, and a mail server for transmitting an email concerning the event at the information processing apparatus 1 can be designated.

Figure 25:
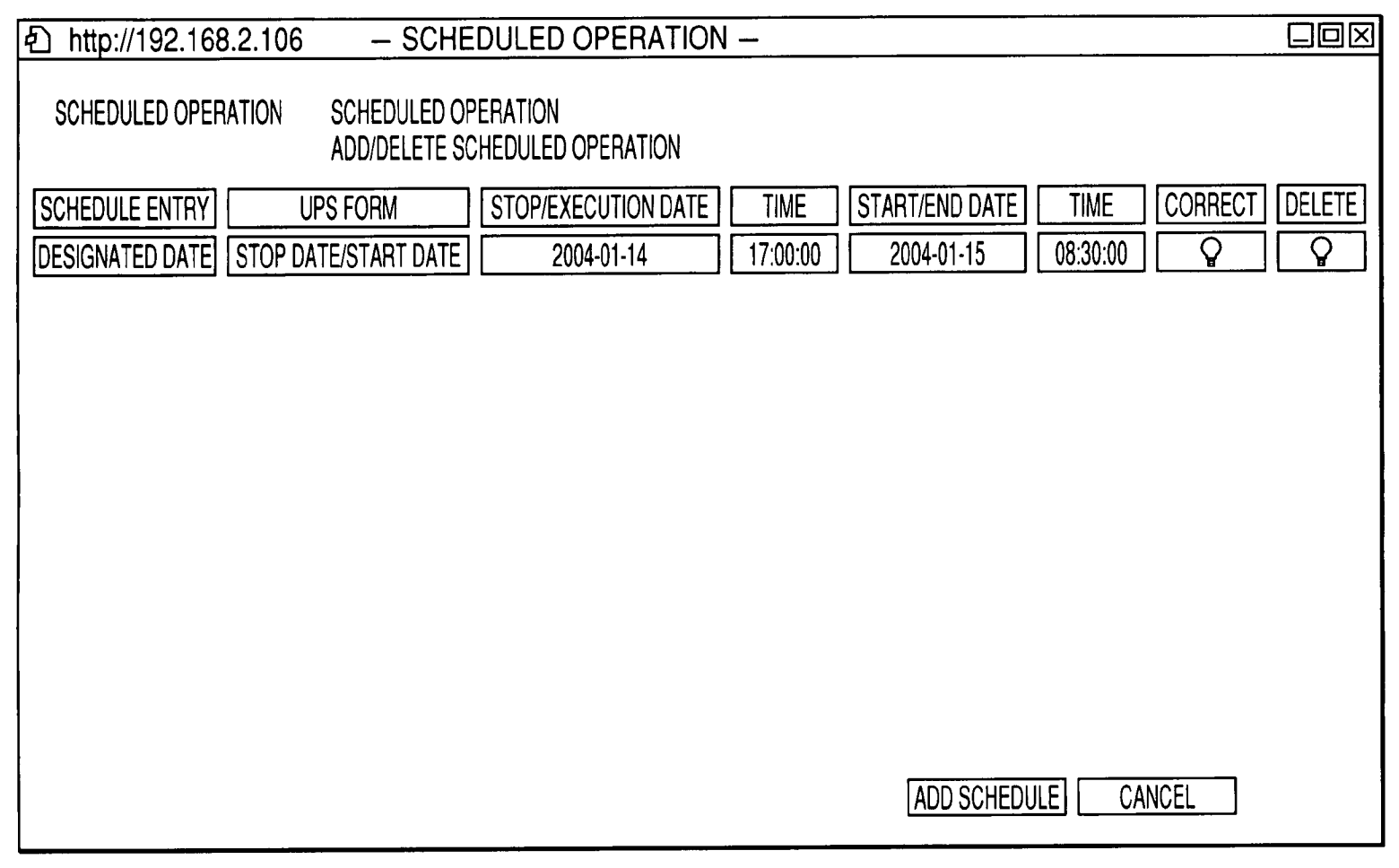

FIGS. 24 and 25 are example setup screens for setting common entry "schedule".

As is shown in FIGS. 24 and 25, common entry "schedule" is further divided into common entry "scheduled operation" and common entry "add/delete a scheduled operation".

For common entry "scheduled operation", the contents of the schedule, such as the date for the starting or stopping the information processing apparatus 1, the date for the execution of the self-diagnosis test and the date for the execution of the backup test, can be entered as is shown in FIG. 24. In accordance with the schedule, the information processing apparatus 1 is activated or stopped or executes the self-diagnosis test or the backup time test, i.e,. performs the scheduled operation. In FIG. 24, "17:00, Jan. 14, 2004" is set as the date for stopping the information processing apparatus 1, and "8:30, Jan. 15, 2004" is set as the date for starting the information processing apparatus 1. Therefore, in accordance with this schedule, the information processing apparatus 1 was stopped at "17:00, Jan. 14, 2004," and was started at "8:30, Jan. 15, 2004".

For common entry "add/delete a scheduled operation", the contents of a schedule designated in common entry "scheduled operation" can be displayed, as is shown in FIG. 25.

For common entry "access right setup", an ID or a password can be entered to access the information processing apparatus 1.

FIG. 26 is a diagram showing an example setup screen for setting a parameter for common entry "end application information".

For common entry "end application information", information for an application terminated in the shutdown processing, and information for a file automatically saved after the shutdown processing is completed can be displayed, as is shown in FIG. 26. In this case, the user manipulates the input part 26 to select the file name as the file information, and can open this file.

For common entry "immediate shutdown" (FIG. 14), validation or invalidation for the immediate shutdown for the immediate performance of the shutdown processing can be entered. When the validation for immediate shutdown is designated for common entry "immediate shutdown", the shutdown control part 102 immediately transmits the stop instruction to the UPS control part 103 to perform the shutdown processing.

FIG. 27 is a diagram showing an example setup screen for setting a parameter for common entry "agent search".

For common entry "agent search", an automatic or a manual search for the slave 1-2 or 1-3 connected to the network 81 can be performed, as is shown in FIG. 27. Further, for common entry "agent search", the state of the UPS 2 connected to the slave 1-2 or 1-3 that is found by the automatic or manual search can be displayed, such as a hardware abnormality, deterioration of the battery 75, a battery-low state, an over access capacity, a communication error, a non-establishment of a connection for the battery 75, a bypass operation, an input power source abnormality, a power source recovery, or a communication establishment.

For common entry "log-out", the setup screen displayed on the output part 27 for the individual entries and the common entries can be closed. For common entry "online help and version information", an online help screen and a version screen can be opened.

When the process sequence described above is to be performed using software, a program constituting the software is installed on a special hard disk for a computer, is downloaded a cross a network, or is read from a recording medium, for example, to a general personal computer that can execute various functions by installing various programs.

Specifically, the program constituting the application software that employs, as modules, the UPS monitoring part 51, the shutdown control part 52 and the UPS control part 53 in FIG. 3, or the setup unit 101, the shutdown control part 102 and the UPS control part 103 in FIG. 13 need only be installed on a special hard disk for a computer, or be loaded across network or read from a recording medium, for example, to a general personal computer that can execute various functions by installing various programs.

As is shown in FIG. 2, example recording media on which this program can be stored include removable recording media (package media) 33, constituted by a semiconductor memory, such as magnetic disks (including floppy disks), optical disks (including CD-ROMs (Compact Disk-Read Only Memories) and DVDs (Digital Versatile Disks)) and magneto-optical disks (including MDs (Mini-Disks)), all of which are separately provided, not part of the main body of the apparatus, and are used for the distribution of programs to users. Further, the recording media may be a ROM 22 on which a program is recorded and is provided for a user by being installed, in advance, in an apparatus, or the hard disk that is included in the storage part 28.

However, as is described above, so long as the UPS monitoring part 51, the shutdown control part 52 and the UPS control part 53 in FIG. 3, or the setup unit 101, the shutdown control part 102 and the UPS control part 103 in FIG. 13 satisfactorily perform their functions, their forms are not especially limited.

That is, the UPS monitoring part 51, the shutdown control part 52 and the UPS control part 53 in FIG. 3, or the setup unit 101, the shutdown control part 102 and the UPS control part 103 in FIG. 13 may be constituted by using hardware. In this case, manufacturers need only fabricate hardware that corresponds, for example, to the UPS monitoring part 51, the shutdown control part 52 and the UPS control part 53, and connect the hardware as is shown in FIG. 3, to easily provide a information processing apparatus having a configuration that differs from that in FIG. 2. Further, manufacturers need only fabricate hardware that corresponds, for example, to the setup unit 101, the shutdown control part 102 and the UPS control part 103 in FIG. 13, and connect the hardware as is shown in FIG. 13, to easily provide a information processing apparatus having a configuration that differs from that in FIG. 2.

In addition, when the UPS monitoring part 51, the form shutdown control part 52 and the UPS control part 53 in FIG. 3 are constituted by using software, the configuration is not limited to that in FIG. 3. For example, part or all of the functions of the UPS monitoring part 51, the shutdown control part 52 and the UPS control part 53 may be combined to provide a module configuration, or specific functions of the UPS monitoring part 51, the shutdown control part 52 and the UPS control part 53 may be divided to provide a modular configuration. Furthermore, when the setup unit 101, the shutdown control part 102 and the UPS control part 103 in FIG. 13 are constituted by using software, this configuration is not limited to that in FIG. 13. For example, part or all of the functions of the setup unit 101, the shutdown control part 102 and the UPS control part 103 may be combined together to provide a modular configuration, or specific functions of the setup unit 101, the shutdown control part 102 and the UPS control part 103 may be divided to provide a modular configuration. Or, a program having only one algorithm may be employed.

According to the specifications for this invention, the steps for describing a program stored on a recording medium include not only processes sequentially performed in a time series, but also processes performed in parallel, or independently, instead of in the time series.

Furthermore, according to these specifications, the system represents the all the equipment constituted by a plurality of apparatuses and processors.

What is claimed is:

1. An information processing apparatus comprising:
    an electric power supply part that is directly and continuously connected to a plurality of power supplies to provide, for the information processing apparatus, electric power output by the power supplies;
    a communication part connected directly to each of the plurality of power supplies for exchanging information with the power supplies connected to the electric power supply part;
    a monitoring part for monitoring states of the power supplies connected to the electric power supply part, based on the information that is transmitted to the communication part by the power supplies; and
    a control part for generating control information for controlling the state of at least one of the power supplies connected to the electric power supply part based on monitoring results obtained by the monitoring part, and for permitting the communication part to transmit the control information to the power supply that is to be controlled,
    wherein each of the plurality of power supplies not having experienced an abnormality provides electric power to the information processing apparatus,
    a state shift part for, when an abnormality has occurred at an input power source for at least one of the power supplies connected to the electric power supply part and when, as a result, it is determined that the number of power supplies for which input power sources are in the normal state is smaller than a predetermined number by the monitoring part, performing a processing wherein the information processing apparatus stops a currently performed processing and in accordance with predetermined procedures, the state of the information processing apparatus is shifted from an operating state to a state that is not affected by the cutoff of electric power supplied by the electric power supply part, and for, when the determination result obtained by the monitoring part indicates the other cases, performing a processing wherein the operating state of the information processing apparatus is maintained,
    wherein, when the monitoring part determines that an abnormality has occurred at the input power source of at least one of the power supplies connected to the electric power supply part, the control part generates, as control information, a stop instruction for shifting the power supply from an operating state in which the output of electric power is performed, to a stopped state in which the output of electric power is stopped, and
    wherein, before the state shift part begins a processing the control part permits the communication part to transmit a stop instruction to a power supply for which it has been determined that an abnormality has occurred at the input power source.

2. An information processing apparatus comprising:
    an electric power supply part that is directly and continuously connected to a plurality of power supplies to provide, for the information processing apparatus, electric power output by the power supplies;
    a communication part connected directly to each of the plurality of power supplies for exchanging information with the power supplies connected to the electric power supply part;

a monitoring part for monitoring states of the power supplies connected to the electric power supply part, based on the information that is transmitted to the communication part by the power supplies; and a control part for generating control information for controlling the state of at least one of the power supplies connected to the electric power supply part based on monitoring results obtained by the monitoring part, and for permitting the communication part to transmit the control information to the power supply that is to be controlled, wherein each of the plurality of power supplies not having experienced an abnormality provides electric power to the information processing apparatus, a state shift part for, when an abnormality has occurred at an input power source for at least one of the power supplies connected to the electric power supply part and when, as a result, it is determined that the number of power supplies for which input power sources are in the normal state is smaller than a predetermined number by the monitoring part, performing a processing wherein the information processing apparatus stops a currently performed processing and in accordance with predetermined procedures, the state of the information processing apparatus is shifted from an operating state to a state that is not affected by the cutoff of electric power supplied by the electric power supply part, and for, when the determination result obtained by the monitoring part indicates the other cases, performing a processing wherein the operating state of the information processing apparatus is maintained, a detector for detecting the number of power supplies wherein abnormalities at the input power sources have occurred, wherein, when it is determined that a difference between the count of the power supplies connected to the electric power supply part and the count of the power supplies detected by the detector is smaller than a predetermined number, the state shift part performs a processing wherein the information processing apparatus stops a processing currently being performed, and in accordance with predetermined procedures, the operating state of the information processing apparatus is shifted to a state that is not affected by the cutoff of electric power from the electric power supply part, and wherein, when the monitoring result obtained by the monitoring part is for the other cases, the state shift part performs a processing wherein the operating state of the information processing apparatus is maintained, wherein, when the monitoring part determines that an abnormality has occurred at the input power source of at least one of the power supplies connected to the electric power supply part, the control part generates, as control information, a stop instruction for shifting the power supply from an operating state in which the output of electric power is performed, to a stopped state in which the output of electric power is stopped, and wherein, before the state shift part begins a processing the control part permits the communication part to transmit a stop instruction to a power supply for which it has been determined that an abnormality has occurred at the input power source.

* * * * *